US012587465B2

(12) United States Patent
Wang et al.

(10) Patent No.: US 12,587,465 B2
(45) Date of Patent: Mar. 24, 2026

(54) METHOD AND SYSTEM FOR SUBMARINE CABLE PATH PLANNING

(71) Applicant: City University of Hong Kong, Kowloon (HK)

(72) Inventors: Xinyu Wang, Kowloon (HK); Zengfu Wang, Xi'an (CN); Moshe Zukerman, Kowloon (HK)

(73) Assignee: City University of Hong Kong, Kowloon (HK)

( * ) Notice: Subject to any disclaimer, the term of this patent is extended or adjusted under 35 U.S.C. 154(b) by 369 days.

(21) Appl. No.: 18/518,705

(22) Filed: Nov. 24, 2023

(65) Prior Publication Data

US 2025/0175409 A1     May 29, 2025

(51) Int. Cl.
H04L 45/02          (2022.01)
H04B 3/02           (2006.01)

(52) U.S. Cl.
CPC .............. H04L 45/02 (2013.01); H04B 3/02 (2013.01)

(58) Field of Classification Search
CPC ........ H04L 45/02; H04B 3/02; G06Q 10/047; G06Q 50/06
See application file for complete search history.

(56) References Cited

U.S. PATENT DOCUMENTS

| | | | |
|---|---|---|---|
| 10,425,280 B2 | 9/2019 | Zukerman et al. | |
| 10,805,207 B2 | 10/2020 | Zukerman et al. | |
| 11,228,523 B2 | 1/2022 | Zukerman et al. | |
| 11,500,125 B2 | 11/2022 | Zukerman et al. | |
| 11,635,544 B2 | 4/2023 | Zukerman et al. | |
| 2019/0370711 A1 | 12/2019 | Zukerman et al. | |
| 2021/0091546 A1* | 3/2021 | Bhattacharya | .......... B63B 35/04 |

(Continued)

FOREIGN PATENT DOCUMENTS

CN          115982900 A          4/2023

OTHER PUBLICATIONS

"Submarine telecoms industry report," Submarine Telecoms Forum, Inc., Sterling, Virginia, USA, Tech. Rep., Oct. 2021 (accessed on Jul. 20, 2023). [Online]. Available: https://subtelforum.com/products/submarine-telecoms-industry-report/.

(Continued)

*Primary Examiner* — Hashim S Bhatti
*Assistant Examiner* — Noah James Sugden
(74) *Attorney, Agent, or Firm* — Renner, Kenner, Greive, Bobak, Taylor & Weber

(57)                    ABSTRACT

A computer-implemented method for ultra-long distance path planning includes (a) decomposing a target area into two initial sub-domains, the target area covering a path from a starting point to an end point, at an initial resolution along a direction connecting the starting point to the end point, (b) executing a Fast Marching Method (FMM) in parallel in the two initial sub-domains to obtain an initial path connecting the starting point to the end point, (c) decomposing an area enclosing the initial path into a plurality of subsequent sub-domains at a resolution higher than the initial resolution, wherein the area enclosing the initial path is decomposed aligned with the direction connecting the starting point to the end point, and (d) executing the FMM in parallel in all the sub-domains to obtain an optimal path connecting the starting point and the end point.

22 Claims, 18 Drawing Sheets

⊛ Starting point *A*     ● Endpoint *B*

⎯ ⎯ Cable path $\gamma_7$     ⎯⎯ Cable path $\gamma_a$     ⋯⋯ Cable path $\gamma_b$     ⋯⋯ Cable path $\gamma_c$

(56)        References Cited

U.S. PATENT DOCUMENTS

2021/0373199 A1*  12/2021  Zukerman .............. G01V 1/01
2023/0061400 A1    3/2023   Zukerman et al.
2023/0118359 A1    4/2023   Wang et al.

OTHER PUBLICATIONS

Telegeography, "Submarine cable frequently asked questions," 2023 (accessed on Jul. 20, 2023). [Online]. Available: https://www2.telegeography.com/submarine-cable-faqs-frequently-asked-questions.
J. Kim, "Submarine cables: the invisible fiber link enabling the Internet," May 4, 2023 (accessed on Jul. 20, 2023). [Online]. Available: https://dgtlinfra.com/submarine-cables-fiber-link-internet/.
"Submarine cable system market size to hit USD 41.02 Bn by 2032," Precedence Research, Apt 1408 1785 Riverside Drive Ottawa, Canada, Tech. Rep., Feb. 2023 (accessed on Jul. 20, 2023). [Online]. Available: https://www.precedenceresearch.com/submarine-cable-system-market.
T. Blaubach, "Connecting Beijing's Global Infrastructure: The PEACE Cable in the Middle East and North Africa," Mar. 7, 2022 (accessed on Jul. 20, 2023). [Online]. Available: https://www.mei.edu/publications/connecting-beijings-global-infrastructure-peace-cable-middle-east-and-north-africa.
C. Mims, "Google, Amazon, Meta and Microsoft weave a fiber-optic web of power," Jan. 15, 2022 (accessed on Jul. 20, 2023). [Online]. Available: https://www.wsj.com/articles/google-amazon-meta-and-microsoft-weave-a-fiber-optic-web-of-power-11642222824.
X. Wang, Z. Wang, E. Tahchi, and M. Zukerman, "Submarine cable path planning based on weight selection of design considerations," IEEE Access, vol. 9, pp. 123 847-123 860, 2021.
W. Qiu, "Submarine cables cut after Taiwan earthquake in Dec. 2006," Mar. 2011 (accessed on Jul. 20, 2023). [Online]. Available: https://www.submarinenetworks.com/en/news/cables-cut-after-taiwan-earthquake-2006.
C. Arthur, "Undersea internet cables off Egypt disrupted as navy arrests three," Mar. 2013 (accessed on Jul. 20, 2023). [Online]. Available: https://www.theguardian.com/technology/2013/Mar/28/egypt-undersea-cable-arrests.
X. Wang, Z. Wang, T. Wang, and M. Zukerman, "Designing cost-effective and reliable submarine communications cable path: Lessons from the Tonga volcano disaster," IEEE Commun. Mag., 2023.
J. A. Sethian, "Fast marching methods," SIAM Review, vol. 41, No. 2, pp. 199-235, 1999.
Q. Wang, J. Guo, Z. Wang, E. Tahchi, X. Wang, B. Moran, and M. Zukerman, "Cost-effective path planning for submarine cable network extension," IEEE Access, vol. 7, pp. 61883-61895, 2019.
V. Dolean, P. Jolivet, and F. Nataf, An introduction to domain decomposition methods: algorithms, theory, and parallel implementation. SIAM, 2015.
B. F. Smith, "Domain decomposition methods for partial differential equations," in Parallel Numerical Algorithms. Springer, 1997, pp. 225-243.
X. Cai, "Overlapping domain decomposition methods," in Advanced Topics in Computational Partial Differential Equations: Numerical Methods and Diffpack Programming. Springer, 2003, pp. 57-95.
M. Herrmann, "A domain decomposition parallelization of the fast marching method," Center for Turbulence Research Annual Research Briefs 2003, 2003.
A. Rosenfeld, Multiresolution image processing and analysis. Springer Science & Business Media, 2013, vol. 12.
H. Wu, Z. Zhao, and Z. Wang, "META-Unet: Multi-scale efficient transformer attention Unet for fast and high-accuracy polyp segmentation," IEEE Trans. Autom. Sci. Eng., 2023.
M. Breuß, E. Cristiani, P. Gwosdek, and O. Vogel, "An adaptive domain-decomposition technique for parallelization of the fast marching method," Appl. Math. Comput., vol. 218, No. 1, pp. 32-44, 2011.

G. Evans and M. Page, "The planning and surveying of submarine cable routes," in Submarine Cables. Brill Nijhoff, 2014, pp. 91-122.
Makai Ocean Engineering, "Submarine cable services," 2015 (accessed on Jul. 20, 2023). [Online]. Available: https://www.makai.com/.
S. Neumayer, G. Zussman, R. Cohen, and E. Modiano, "Assessing the vulnerability of the fiber infrastructure to disasters," IEEE/ACM Trans. Netw., vol. 19, No. 6, pp. 1610-1623, 2011.
P. N. Tran and H. Saito, "Geographical route design of physical networks using earthquake risk information," IEEE Commun. Mag., vol. 54, No. 7, pp. 131-137, 2016.
M. Zhao, T. W. Chow, P. Tang, Z. Wang, J. Guo, and M. Zukerman, "Route selection for cabling considering cost minimization and earthquake survivability via a semi-supervised probabilistic model," IEEE Trans. Ind. Inform., vol. 13, No. 2, pp. 502-511, 2016.
Z. Wang, Q. Wang, M. Zukerman, J. Guo, Y. Wang, G. Wang, J. Yang, and B. Moran, "Multiobjective path optimization for critical infrastructure links with consideration to seismic resilience," Comput.-Aided Civ. Infrastruct. Eng., vol. 32, No. 10, pp. 836-855, 2017.
C. Huang, Z. Ming, and H. Huang, "Drone stations-aided beyond-battery-lifetime flight planning for parcel delivery," IEEE Trans. Autom. Sci. Eng., 2022.
Q. Wang, Z. Wang, J. Guo, E. Tahchi, X. Wang, B. Moran, and M. Zukerman, "Path planning of submarine cables," in Proc. 21st International Conference on Transparent Optical Networks (ICTON). IEEE, 2019, pp. 1-4.
Z. Wang, Q. Wang, B. Moran, and M. Zukerman, "Optimal submarine cable path planning and trunk-and-branch tree network topology design," IEEE/ACM Trans. Netw., vol. 28, No. 4, pp. 1562-1572, 2020.
T. Wang, Z. Wang, B. Moran, X. Wang, C. Guo, and M. Zukerman, "Latency-aware optimization of submarine communication cable systems with trunk-and-branch topologies," J. Light. Technol., vol. 40, No. 17, pp. 5825-5841, 2022.
T. Wang, Z. Wang, B. Moran, and M. Zukerman, "Submarine cable network design for regional connectivity," IEEE/ ACM Trans. Netw., vol. 30, No. 6, pp. 2480-2492, 2022.
T. G. B. C. of the Oceans, "Gridded bathymetry data," 2023 (accessed on Jul. 20, 2023). [Online]. Available: https://www.gebco.net/data_and_products/gridded_bathymetry_data/.
S. Blaise and B. Spinewine, "Efficient curvature-constrained least cost route optimization on parallel architectures," Eng. Comput., pp. 1-17, 2021.
M. Akian, S. Gaubert, and S. Liu, "A multilevel fast-marching method," in Proc. MTNS 25th International Symposium on Mathematical Theory of Networks and Systems, 2022.
S. Vadrevu and R. Nagi, "A GPU accelerated dual-ascent algorithm for the multidimensional assignment problem in a multitarget tracking application," IEEE Trans. Autom. Sci. Eng., 2022.
J. Xin, G. Xie, B. Yan, M. Shan, P. Li, and K. Gao, "Multimobile robot cooperative localization using ultra-wideband sensor and GPU acceleration," IEEE Trans. Autom. Sci. Eng., vol. 19, No. 4, pp. 2699-2710, 2021.
Y. Huang, "Improved fast iterative algorithm for Eikonal equation for GPU computing," arXiv preprint arXiv:2106.15869, 2021.
J. Monsegny, J. Monsalve, K. Leo'n, M. Duarte, S. Becerra, W. Agudelo, and H. Arguello, "Fast marching method in seismic ray tracing on parallel GPU devices," in Proc. Latin American High Performance Computing Conference. Springer, 2018, pp. 101-111.
Z. Zhao, J. Wang, G. Gao, H. Wang, and D. Wang, "Multi-objective optimization for submarine cable route planning based on the ant colony optimization algorithm," vol. 10, No. 8, 2023, article No. 896.
D. Li, L. Wang, J. Cai, K. Ma, and T. Tan, "Research on terminal distance index-based multi-step ant colony optimization for mobile robot path planning," IEEE Trans. Autom. Sci. Eng., 2022.
G. Diamantopoulos, J. Weinbub, A. Hossinger, and S. Selberherr, "Evaluation of the shared-memory parallel fast marching method for re-distancing problems," in Proc. 17th International Conference on Computational Science and Its Applications (ICCSA). IEEE, 2017, pp. 1-8.

(56) References Cited

OTHER PUBLICATIONS

X. Wang, G. Cheng, Z. Wang, and M. Zukerman, "A research on submarine cable path planning," in Proc. Eighth Symposium on Novel Photoelectronic Detection Technology and Applications, vol. 12169. SPIE, 2022, pp. 512-519.

G. Diamantopoulos, A. Hossinger, S. Selberherr, and J. Weinbub, "A shared memory parallel multi-mesh fast marching method for re-distancing," Adv. Comput. Math., vol. 45, pp. 2029-2045, 2019.

J. Weinbub and A. Hossinger, "Shared-memory parallelization of the fast marching method using an overlapping domain-decomposition approach," in Proc. 24th High Performance Computing Symposium, 2016, pp. 1-8.

M. Quell, G. Diamantopoulos, A. Hossinger, and J. Weinbub, "Shared-memory block-based fast marching method for hierarchical meshes," J. Comput. Appl. Math., vol. 392, p. 113488, 2021.

ITU, "Maximising availability of international connectivity in developing countries: Strategies to ensure global digital inclusion," Dec. 2016 (accessed on Jul. 20, 2023). [Online]. Available: http://handle. itu.int/11.1002/pub/80f5eade-en.

K. Eriksson, D. Estep, and C. Johnson, Applied mathematics: Body and soul: vol. 1: Derivatives and geometry in IR3. Springer Science & Business Media, 2013.

D. Burago, Y. Burago, and S. Ivanov, A course in metric geometry. American Mathematical Society, 2022, vol. 33.

J. A. Sethian et al., Level set methods and fast marching methods. Cambridge Cambridge UP, 1999, vol. 98, No. 2.

R. Kimmel and J. A. Sethian, "Optimal algorithm for shape from shading and path planning," J. Math. Imaging Vis., vol. 14, pp. 237-244, 2001.

R. Kimmel and J.A. Sethian, "Computing geodesic paths on manifolds," Proceedings of the National Academy of Sciences, vol. 95, No. 15, pp. 8431-8435, 1998.

A. Rosenfeld, Multiresolution image processing and analysis. Springer Science & Business Media, 2013, vol. 12, "5. Multiresolution Processing", pp. 77-85.

K. Eriksson, D. Estep, and C. Johnson, Applied mathematics: Body and soul: vol. 1: Derivatives and geometry in IR3. Springer Science & Business Media, 2013, "Lipschitz Continuity and Cauchy Sequences", Preface XI-Preface XIII.

D. Burago, Y. Burago, and S. Ivanov, A course in metric geometry. American Mathematical Society, 2022, vol. 33, "2.5 Shortest Paths", pp. 44-47.

K.-H. Hoffmann and J. Zou, "Parallel efficiency of domain decomposition methods," Parallel Comput., vol. 19, No. 12, pp. 1375-1391, 1993.

E. Cristiani and M. Falcone, "A characteristics driven fast marching method for the Eikonal equation," in Proc. 7th European Conference on Numerical Mathematics and Advanced Applications, Graz, Austria, Sep. 2007. Springer, 2008, pp. 695-702.

Z. Wang, Q. Wang, B. Moran and M. Zukerman, "Application of the Fast Marching Method for Path Planning of Long-haul Optical Fiber Cables With Shielding," IEEE Access, vol. 6, No. 1, pp. 41367-41378, Dec. 2018. Available on: https://ieeexplore.ieee.org/document/8408789/.

Z. Wang, Q. Wang, M. Zukerman and B. Moran, "A Seismic Resistant Design Algorithm for Laying and Shielding of Optical Fiber Cables," IEEE/OSA Journal of Lightwave Technology, vol. 35, No. 14, pp. 3060-3074, Jul. 2017. Available on: http://www.ee. cityu.edu.hk/~zukerman/J161.pdf.

Z. Wang, Q. Wang, B. Moran and M. Zukerman, "Terrain Constrained Path Planning for Long-haul Cables," Optics Express, vol. 27, No. 6, pp. 8221-8235, Mar. 2019. Available on: https://www. ee.cityu.edu.hk/~zukerman/J168.pdf.

T. Wang, X. Wang, Z. Wang, C. Guo, B. Moran, and M. Zukerman, "Optimal Tree Topology for a Submarine Cable Network With Constrained Internodal Latency," IEEE/OSA Journal of Lightwave Technology, vol. 39, No. 9, pp. 2673-2683, May 2021. Available on: http://www.ee.cityu.edu.hk/~zukerman/j180.pdf.

U.S. Appl. No. 18/315,517.

Chinese Patent Application Serial No. 202310392534.2.

U.S. Appl. No. 17/829,655.

* cited by examiner

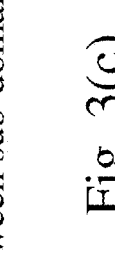
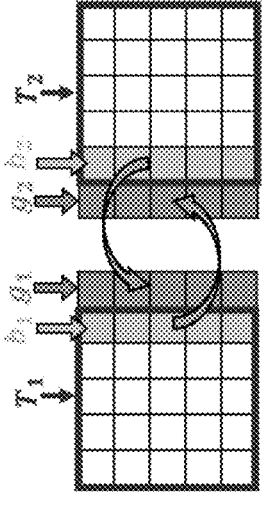
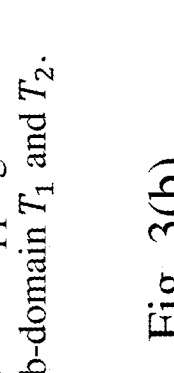
(c) Data exchange between sub-domains.
Fig. 3(c)
(b) Overlapping between sub-domain $T_1$ and $T_2$.
Fig. 3(b)
(a) The initial domain $T$ is divided into two sub-domains $T_1$ and $T_2$ by the red dash line.
Fig. 3(a)

(b) Level sets.

(a) Solution $\phi(X)$.

(b) A bad domain decomposition.

(a) A good domain decomposition.

(b) A bad domain decomposition.

(a) A good domain decomposition.

$k = 1$. Dividing the initial region $T$ into two along $\overrightarrow{AB}$.

$k = 1$. Producing the cable path $\gamma_1$ and identifying the decomposition lines $l_1^k$, $l_2^k$ that enclose the cable path $\gamma_1$.

$k = 2$. Increasing the resolution for area $T_{l_1^k l_2^k}$ between $l_1^k$ and $l_2^k$, and dividing $T_{l_1^k l_2^k}$ into two sub-domains $T_{l_1^k l_3^k}$ and $T_{l_2^k l_3^k}$.

$k = 2$. Producing the optimal cable path $\gamma_2$ under Fig. 9(c).

$k = 3$. Identifying the decomposition lines $l_1^k$, $l_2^k$ that enclose the cable path $\gamma_2$.

$k = 3$. Increasing the resolution for area $T_{l_1^k l_2^k}$ between $l_1^k$ and $l_2^k$, and dividing $T_{l_1^k l_2^k}$ into four sub-domains $T_{l_1^k l_3^k}$, $T_{l_3^k l_4^k}$, $T_{l_4^k l_5^k}$ and $T_{l_5^k l_2^k}$.

$k = 3$. Producing the optimal cable path $\gamma_3$ under Fig. 9(f).

$k = 7$. Final submarine cable path $\gamma_7$ for APFMM.

METHOD AND SYSTEM FOR SUBMARINE CABLE PATH PLANNING

TECHNICAL FIELD

The present invention relates to methods and systems for path planning. In particular, the present invention relates to methods and systems for submarine cable path planning using adaptive parallel fast marching method.

BACKGROUND

Submarine optical fiber communication cables (hereafter submarine cables) serve as the pivotal arteries of our increasingly interconnected world, carrying over 99% of global voice and data traffic [1]. This extensive network, comprising 552 active and planned submarine cable systems, spanning over 1.4 million kilometers as of early 2023 [2], represents a significant financial investment, with costs approximating 25,000 USD per kilometer [3]. These cables, therefore, play an essential role in shaping our digital future. In 2022, the global submarine cable system market reached a value of 15.6 billion USD, and by 2032, it is projected to grow to approximately 41.02 billion USD, exhibiting a significant compound annual growth rate of 10.15% from 2023 to 2032 [4]. Evidence of this growth is also reflected in the Chinese Government's recognition of telecommunications cabling within the "One Belt One Road" strategic initiative [5] and the increasing investment in the internet's critical cable infrastructure from the tech giants such as Google, Amazon, Meta, and Microsoft [6]. Global communications are facilitated by the use of submarine cables.

Although the costs of laying and maintaining submarine cables are substantial, this vital infrastructure is not without its vulnerabilities. Submarine cables are susceptible to risks associated with various natural and anthropogenic disasters [7], which can result in severe socio-economic consequences if the cables are damaged or severed. These risks and costs are compounded by the fragility of the submarine cable systems, with over 100 faults reported each year [2]. Incidents such as the Hengchun earthquake in 2006 [8], the cable-cutting event in Egypt in 2013 [9], and the Tonga-Fiji cable system breakage caused by an undersea volcano eruption in 2022 [10], all highlight the potential for significant disruption to global communication networks. The potential socio-economic impact of such outages is considerable, particularly in sectors such as finance, where even brief communication interruptions can result in substantial losses. The current industry standard for designing reliable, cost-effective submarine cables depends on manual methods and expert knowledge. This process involves using various data sources and tools to generate alternative paths, followed by feasibility checks, detailed examinations, and comparisons. However, this approach is subjective and may not always yield near-optimal paths.

SUMMARY OF THE INVENTION

Submarine cables form the backbone of the Internet's infrastructure. Damage to these cables can precipitate Internet outages with far-reaching socio-economic impacts. The prevailing practice of manual cable routing is laborious, considering the thousands of kilometers these cables span. It also fails to strike an optimal balance between cost and risk due to its lack of scalability and precision. The Fast Marching Method (FMM), a non-iterative, precise numerical approach capable of solving the Eikonal equation, offers a viable alternative by optimizing the required path between source and destination, considering a summary objective function of costs and risk factors. An interpretation of its solution signifies the shortest distance between a starting point and all other points. However, the sequential nature of the FMM algorithm impedes direct parallelization. According to embodiments of the invention, an Adaptive Parallel FMM (APFMM) based on an adaptive domain decomposition method and a multi-resolution analysis is proposed, which provides a scalable and widely applicable method that is adept at planning high-precision, ultra-long-distance (over 14,000 km) submarine cable routes over the Earth's surface. Simulated experiment results corroborate that APFMM not only addresses the computational limitations of the sequential FMM, particularly with massive datasets but also trims the running time by over 81% compared to general parallel FMM. This makes efficient, automatic, and high-precision long-distance submarine cable path planning a tangible possibility.

According to a first aspect of the invention, there is provided a computer-implemented method for ultra-long distance path planning, which includes (a) decomposing a target area into two initial sub-domains, the target area covering a path from a starting point to an end point, at an initial resolution along a direction connecting the starting point to the end point, (b) executing a Fast Marching Method (FMM) in parallel in the two initial sub-domains to obtain an initial path connecting the starting point to the end point, (c) decomposing an area enclosing the initial path into a plurality of subsequent sub-domains at a resolution higher than the initial resolution, wherein the area enclosing the initial path is decomposed aligned with the direction connecting the starting point to the end point, and (d) executing the FMM in parallel in all the sub-domains to obtain an optimal path connecting the starting point and the end point.

In some embodiments, the computer-implemented method may further include (e) iterating the steps (c) and (d) by increasing the number of the subsequent sub-domains until the optimal path is obtained.

In some embodiments, in the step (e) the resolution may be increased as the number of the subsequent sub-domains is increased.

In some embodiments, the resolution may not be increased in the target area outside the area enclosing the initial path given that the path obtained from a previous loop did not traverse the area.

In some embodiments, the optimal path may be determined based on a minimal total life-cycle cost for an object installed along the path.

In some embodiments, the object may include a submarine cable.

In some embodiments, a total life-cycle cost for a cable path may be determined by integrating a life-cycle cost per unit length of the submarine cable across the total cable length, the life-cycle cost being based on the sum of weighted cost elements corresponding to initial outlay for construction, recurring costs for maintenance, and/or expenses related to repairs for the submarine cable.

In some embodiments, executing the FMM may include employing a nonlinear partial differential equation, or preferably employing the Eikonal equation.

In some embodiments, in step (c) the area enclosing the initial path may be defined by two decomposition lines parallel to the direction connecting the starting point to the endpoint and enclosing the initial path.

In some embodiments, the area enclosing the initial path may be decomposed such that a frequency of communication between adjacent sub-domains is reduced.

In some embodiments, in step (c) the sub-domains may be divided along the fastest propagation direction of the FMM.

In some embodiments, the target area or the area enclosing the initial path may be decomposed to have overlapping regions between adjacent sub-domains.

In some embodiments, the ultra-long distance may be 10,000 km or more, or preferably 14,000 km or more.

According to a second aspect of the invention, there is provided a computer-implemented method for submarine cable path planning, which includes (a) initializing decomposition index k=1 and assigning an initial resolution to a target area T covering a path from a starting point to an end point, (b) decomposing the target area T into two initial sub-domains along a direction connecting the starting point to the end point, (c) executing a Fast Marching Method (FMM) in parallel from the starting point for each sub-domain to obtain an initial cable path, (d) increasing the decomposition index k=k+1, and identifying two decomposition lines $$l_1^k$$

and $$l_2^k,$$

parallel to the direction connecting the starting point to the endpoint and enclosing the initial cable path, wherein the target area is divided into an area $$T_{l_1^k l_2^k}$$

between the two decomposition lines $$l_1^k$$

and $$l_2^k,$$

and two sub-domains $$T_{l_1^k}$$

and $$T_{l_2^k}$$

outside the decomposition lines $$l_1^k$$

and $$l_2^k,$$

(e) increasing the resolution for the area $$T_{l_1^k l_2^k}$$

between the two decomposition lines $$l_1^k$$

and $$l_2^k,$$

and decomposing the area $$T_{l_1^k l_2^k}$$

into $2^{k-1}$ sub-domains $$\left( T_{l_1^k l_3^k}, T_{l_3^k l_4^k}, \ldots, T_{l_{3+2^{k-1}-1}^k l_2^k} \right),$$

aligned with the direction connecting the starting point to the end point, (f) assigning the $2^{k-1}$ sub-domains in the area $$T_{l_1^k l_2^k}$$

along with the two sub-domains $$T_{l_1^k}$$

and $$T_{l_2^k}$$

outside the decomposition lines $$l_1^k$$

and $$l_2^k$$

to $2^{k-1}+2$ threads to execute the FMM in parallel for all the sub-domains to obtain an optimal cable path, and (g) reiterating the steps (d) to (f) until the area $$T_{l_1^k l_2^k}$$

achieves the highest possible data resolution, or the total number of sub-domains for the next decomposition $2^k+2$ surpasses a predetermined maximum number of available threads.

In some embodiments, in step (e), the area $$T_{l_1^k l_2^k}$$

may be divided into equally-sized $2^{k-1}$ sub-domains along the direction connecting the starting point to the end point.

In some embodiments, for the target area T outside the area $$T_{l_1^k l_2^k},$$

the resolution may not be increased given that the cable path obtained from a previous loop did not traverse the area.

In some embodiments, the optimal cable path may be determined based on a minimal total life-cycle cost for the submarine cable.

In some embodiments, the FMM may be designed to consider a 3D topography of a seafloor.

According to a third aspect of the invention, there is provided a system for submarine cable path planning, which includes one or more processors, and a memory storing one or more programs configured to be executed by the one or more processors, the one or more programs including instructions for performing or facilitating performing of the computer-implemented method as aforementioned.

According to a fourth aspect of the invention, there is provided a non-transitory computer readable medium having instructions stored thereon which, when executed by one or more processors, cause the one or more processors to execute the computer-implemented method as aforementioned.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF DRAWINGS

Embodiments of the invention will now be described, by way of example, with reference to the accompanying drawings in which:

FIG. 2(a) shows an example of a two-dimensional orthogonal grid with a grid spacing h, and FIG. 2(b) shows an example of a triangulated grid where these triangles are not necessarily in the same plane.

FIG. 3(a) to FIG. 3(c) show schematic diagrams depicting overlapping domain decomposition method (DDM). FIG. 3(a) shows that an initial domain T is divided into two sub-domains $T_1$ and $T_2$ by the dash line. FIG. 3(b) shows overlapping between sub-domain $T_1$ and $T_2$. FIG. 3(c) shows data exchange between sub-domains.

Figure 1:
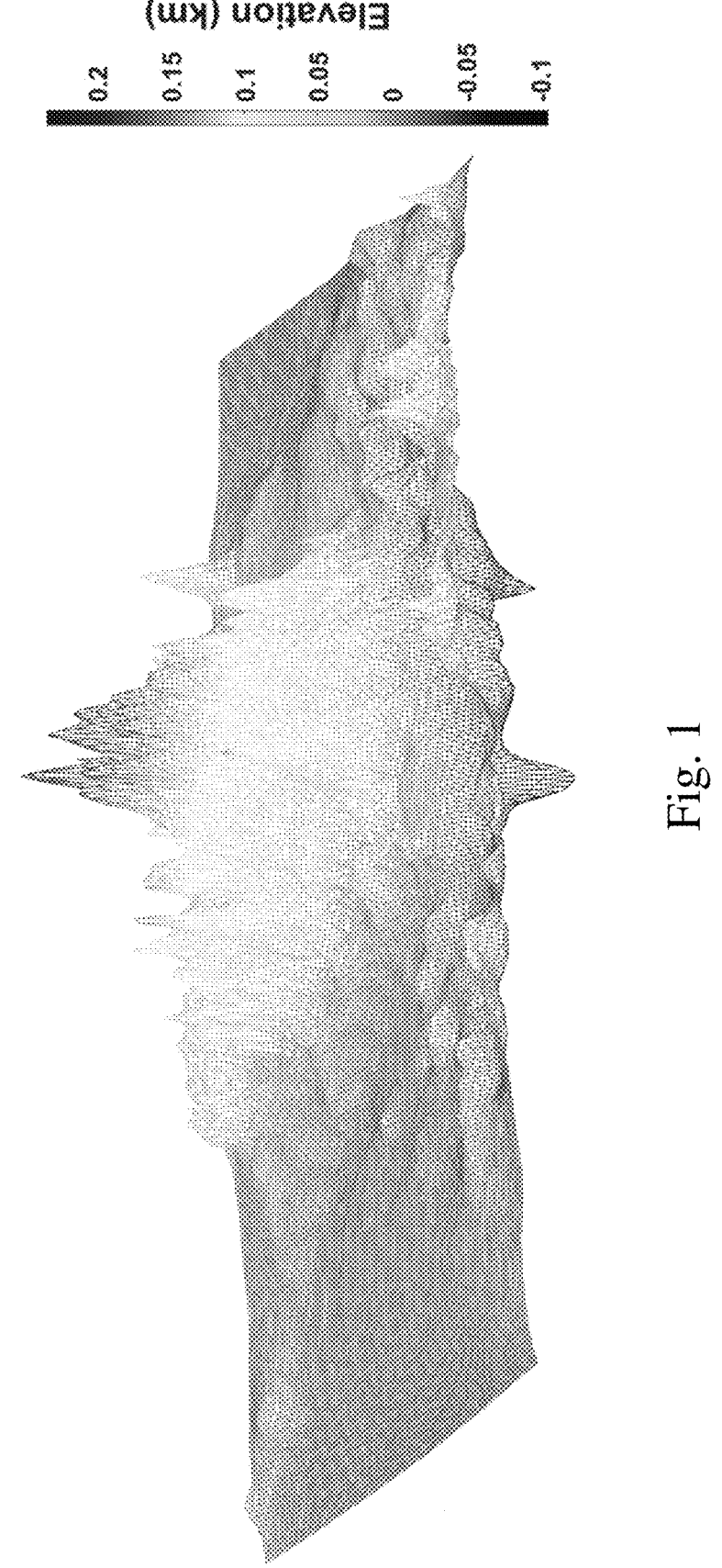
FIG. 1 shows an example of the Earth's surface model.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Hereinafter, some embodiments of the invention will be described in detail with reference to the drawings.

The Fast Marching Method (FMM) [11] is a highly effective and asymptotically optimal numerical method for solving the Eikonal equation. The solution of FMM can be interpreted as the shortest or least-cost path from a given starting point to all other points over a triangulated manifold that models the Earth's surface [11]. FMM operates based on an ordered heap algorithm, starting at the source point and "marching" outward. At each step, it selects the unprocessed grid point (or pixel) with the shortest total travel time (the least life-cycle cost in this context) and updates the travel times of its neighbors. This process continues until all points are processed, or the destination is reached. Finally, the least life-cycle cost path from the destination to the source can be found by backtracking along the gradient of the travel time. In the context of submarine cable path planning, "cost" is referred to as "life-cycle cost", where the life-cycle cost of submarine cables is the total cost over their entire life span (usually 25 years [2]). In fact, life-cycle cost covers a variety of factors that affect the construction, maintenance, and repair of submarine cables, such as cable length, earthquakes, volcanic eruptions, seabed slope, water depth, and related human activities (fishing and anchoring), and so on [12].

However, modern society's massive global communication needs make the construction of ultra-long distance (extending over 10,000 km) interoceanic cable no longer rare [2]. Designing high-precision and ultra-long-distance transoceanic submarine cable paths poses significant challenges when using the sequential FMM (SFMM). The primary difficulty arises from the sheer size of the target area. The SFMM cannot overcome the problems posed by the computationally prohibitive large data size associated with such expansive regions. The computational burden of processing this massive amount of data results in excessively long calculation times. In some cases, the volume of data is so great that direct computation becomes practically unfeasible. This computational hindrance underscores the need for more efficient algorithms to handle large-scale problems within a reasonable timeframe and computational budget. Unfortunately, FMM's single-pass and sequential propagation characteristics make it unable to be straightforwardly parallelized, which can be an issue for large-scale problems.

Domain decomposition methods (DDM) [13] are techniques for breaking down a large-scale problem into smaller sub-problems. Each of these sub-problems can be solved independently and in parallel on different computing units. This technique can be effectively applied to parallelize the FMM. Specifically, in the case of FMM, DDM can be accomplished by partitioning the entire computational domain (for instance, the target seabed area) into multiple smaller sub-domains. FMM can then be executed independently within each sub-domain, enabling the computation of the shortest paths in parallel. Once all sub-domains have been processed, a suitable reorganization strategy, such as a multilevel strategy or an optimal reorganization strategy, can be employed to assemble the results from all the sub-domains into a comprehensive global result. This approach transforms a problem, which would originally require sequential processing of nodes in a specific order, into a series of sub-problems that can be processed concurrently.

However, managing the interfaces between sub-domains is a significant challenge when using DDM. At these boundaries, it is crucial to ensure accurate information transfer to yield a precise global solution. Currently, a common approach is to employ a DDM with overlapping regions between sub-domains [14, 15], but extensive research on optimal domain decomposition is lacking. Optimal domain decomposition can make the number of communication and rollback operations between sub-domains very small, and the computing load of each sub-domain is close to balance, achieving far better parallel performance with the minimum parallelization overhead [16].

Multi-resolution Analysis (MRA) [17] analyzes data across multiple scales, with wide applications in fields like image processing and signal processing [18]. In the parallelization of the FMM, MRA can be combined with the DDM, where MRA guides the domain decomposition to facilitate load balancing and efficient parallel computation. Specifically, the computational domain can be roughly decomposed at the coarsest resolution initially, and these rough sub-domains are then assigned to different threads for parallel computation to obtain an initial cable path. Subsequently, based on the initial path, the region near the preliminary path is decomposed more finely [19], and the resolution around the initial path's sub-domains is then increased concurrently. This may imply resolution imbalance in the different domains. Then, to achieve load balancing, these new sub-domains are further split into sub-domains and reassigned to different threads for updated and refined computations. This approach ensures that the computational load of each thread is approximately balanced, thereby enhancing the efficiency of parallel computation. By iterating multiple times, each iteration further refines the mesh in critical areas, gradually improving the accuracy of the submarine cable path.

Some embodiments of the invention propose an Adaptive Parallel FMM (APFMM), a novel algorithm for high-precision and ultra-long-distance submarine cable path planning. This algorithm addresses computational challenges in large target areas, improves efficiency, and enhances solution accuracy. Leveraging DDM and MRA, the proposed APFMM ensures optimized thread load distribution and increases computational efficiency by minimizing communication between adjacent sub-domains.

The major contributions of the embodiments of the invention are as follows.

1) The embodiments of the invention propose an APFMM algorithm, which, for the first time, enables high-precision, ultra-long-distance (over 14,000 km) submarine cable path planning considering various factors affecting cable reliability and cost. The proposed APFMM algorithm addresses the computationally prohibitive issues associated with the massive data size in extremely large target areas that traditional SFMM encounters, enhancing computational efficiency while improving the accuracy of the planned submarine cable path.

2) The proposed APFMM algorithm, leveraging the strengths of DDM and MRA, dynamically decomposes the target area and adjusts the resolution of different sub-domains during the APFMM implementation. In contrast to the general parallel FMMs, the proposed algorithm ensures a balanced load distribution across different threads to some extent, thereby optimizing the utilization of all threads to the greatest extent possible.

3) The impact of different sub-domain decomposition methods on the performance of parallel FMMs is investigated. Experimental results indicate that the proposed DDM, compared to the traditional regular sub-domain division (for example, regular rectangular partition) approach, effectively reduces the frequency of communication between adjacent sub-domains (i.e., the number of rollbacks operations [20]), leading to a considerable improvement in computational efficiency.

In Section I, the related works in the field of submarine cable path planning and the parallelization of FMM are surveyed. Section II introduces the models used in submarine cable path planning. The problem of finding the optimal submarine cable path, defined as the one with the minimal total life-cycle cost between two given fixed points on the Earth, is formulated in Section III. Section IV offers an in-depth discussion on the general SFMM and the APFMM proposed to solve the problem defined in Section III. Then the performance of APFMM in comparison to the SFMM is evaluated through simulations in Section V. Finally, conclusions are provided in Section VI.

I. Related Work

As mentioned earlier, the prevailing approach to designing cost-effective and reliable submarine cables in the industry relies on a conventional manual method based on expert knowledge [21]. Planners typically harness a wealth of data about the target area, encompassing maps, aerial photos, charts, and satellite gravity bathymetric data. Leveraging commercial planning software tools, they generate preliminary alternative paths that link the start and end points. One such popular software tool is MakaiPlan [22], which generates the cable path based on the "Great Circle" method that provides the shortest path on a sphere. Clearly, this simple sphere model does not take into account the Earth's surface, which may include mountains and valleys, and it does not consider any natural or man-made risk factors. According to [21], a subsequent preliminary survey is conducted for the preliminary alternative paths to ascertain their feasibility and sensibility. The final step involves meticulously examining all pertinent details along the cable's path and thoroughly comparing the alternatives. Consequently, the path route is determined. This method heavily leans on the subjective judgments of the planners. Owing to constraints of time and resources, planners may not always be able to consider all available alternatives and the entire array of factors that could impact the cost and resilience of submarine cables. Therefore, it may fall short of yielding a near-optimal path.

Several studies have been performed on models and analyses in the context of cables and cable networks. Neumayer et al. [23] provide a network that identifies major disruption sites to alleviate disaster impacts. The work of Tran and Saito [24] entails a risk analysis of network fractures due to seismic events and the development of network links for optimal durability within cost limitations. Meanwhile, Zhao et al. [25] utilize Dijkstra's algorithm for grid-based route analysis, aiming to reduce the total cost along the route by considering elements like cable length and earthquake resistance.

Wang et al. [26] address a cable path optimization issue, which was framed as a multi-objective optimization challenge on a 2D manifold in 3D space between two global points. The problem is simplified to an Eikonal equation, solved using FMM [11], rather than the constrained Dijkstra's algorithm used in [27]. FMM's advantage over Dijkstra's algorithm is numerically shown in [12, 28], and it is proven in [11] to provide an optimal route on a given triangulated manifold.

Further exploration of FMM-based optimization techniques for cable networks can be found in [29-31]. For instance, Wang et al. [29] examine a submarine cable system's path planning, considering a trunk-and-branch tree topology on the Earth's surface. Notably, latency constraints for different node pairs in the submarine cable topology network are considered in [30], and [31] incorporates the costs associated with branching units and cable landing stations.

With ongoing developments in seabed exploration and the continuous refinement of data necessary for cable path planning (such as the General Bathymetric Chart of the Oceans' recent release of global ocean & land terrain models with altitude data at 15-arc-second intervals [32]), conditions for high-precision, ultra-long-distance submarine cable path planning have significantly improved. However, the sheer number of grid points in a target area for a submarine cable exceeding 10,000 kilometers can easily reach billions, posing a massive data size problem that conventional submarine cable path planning methods struggle to handle. This issue is further complicated by the sequential nature of the FMM, which is not conducive to straightforward parallelization.

Blaise et al. [33] attempt to accelerate the path design process of offshore pipeline or cable path planning by developing a parallel Dijkstra algorithm. Akian et al. [34] propose a multi-level FMM that employs grid approximations and a "highway hierarchy" technique to approximate solutions for static Hamilton-Jacobi-Bellman equations, allowing FMM to be executed in parallel on each level. Another strategy is to execute FMM in parallel on a graphics processing unit (GPU), which offers more cores than CPUs and can handle large data quantities in parallel [35, 36]. Huang [37]proposes an improved fast iterative method to solve Eikonal equations, which a GPU can parallelize. Monsegny et al. [38] explore efficient FMM implementation on GPUs, but the sequential nature of FMMs makes direct implementation on GPUs a challenging task. Zhao et al. [39]propose an improved ant colony optimization algorithm to optimize the cost and risk of submarine cable path planning. However, the ant colony algorithm has certain inherent issues [40]. These issues include slow convergence speed and sensitivity to parameter settings, such as the release rate of pheromones and the weight of heuristic information.

DDM is one of parallelization methods. It divides the entire computational domain into several sub-domains, each processed by a separate thread. This method requires the management of junctions between sub-domains, often necessitating "ghost nodes" to share information. However, due to FMM's sequential computational steps, synchronizing information between sub-domains (e.g., via rollback operations) can be complicated [16]. The study in [41] shows that the efficiency of parallel FMM greatly depends on how the domain is decomposed, and poor performance results from uneven domain decomposition. Adaptive domain decomposition [20] is an enhanced DDM that can automatically adjust the division of sub-domains according to the features of the problem or the solution (e.g., if a sub-domain is more complex or takes longer time, it can be broken down into smaller sub-domains at runtime), making the computational load more balanced across each sub-domain, thereby improving overall computational efficiency.

MRA breaks down large datasets into smaller subsets for easier processing and understanding at various detail levels. In [19, 42], MRA is used to accelerate FMM and improve cable path solutions. However, the absence of parallel techniques results in increased computation time. An MRA-like multi-mesh approach allows finer resolution in key areas, leading to coarse-grained parallelization and parallel FMMs [43]. Shared-memory parallel FMM approaches based on overlapping DDM are also introduced [44, 45]. However, these methods assume a constant velocity function in the Eikonal equation, which is inappropriate for submarine cable path planning, where different sea areas have varying life-cycle costs. For optimal paths, FMM should propagate faster at points with lower costs, enabling quicker path completion.

As previously described, many publications provide models and analyses related to cables and cable networks, as well as some parallel computing techniques used to speed up the FMM. However, these publications consistently set the velocity function in the Eikonal equation (which is used to formulate the cable path planning problem and solved by FMM) to 1 in the target domain, implying uniform propagation speed at all grid points, which is unsuitable for submarine cable path planning as not every point in the target sea area carries the same life-cycle cost. For optimal cable path planning, the FMM should propagate faster at grid points with lower life-cycle costs, thus enabling the path through these grid points to reach the destination more swiftly.

In conclusion, no scalable parallel FMM method currently available for high-precision long-distance submarine cable path planning considers thread load balancing while ensuring a reasonable adaptive target domain decomposition. The embodiments of the invention address this by applying an adaptive DDM in combination with MRA, utilizing the APFMM algorithm to perform high-precision and ultra-long-distance submarine cable path planning and design.

II. Models

This section describes the Earth's surface and life-cycle cost models for the proposed submarine cable path planning.

A. Earth's Surface Model

The Earth's surface is modeled using a two-dimensional manifold $\mathbb{M}$, which is triangulated and piecewise-linear, situated within $\mathbb{R}^3$. This serves to represent the target area T. Each point on $\mathbb{M}$ is denoted by a three-dimensional coordinate $X=(x, y, z)$, where $\xi=(x, y)$ corresponds to the elevation at the geographical location $(x, y)$. A more comprehensive explanation of the Earth's surface modeling is provided in [12], which is incorporated by reference herein in its entirety. An example of the triangulated piecewise-linear two-dimensional manifold is illustrated in FIG. 1. More details are provided in [7, 12, 26], which are incorporated by reference herein in their entirety.

B. Life-Cycle Cost Model

The life-cycle cost of a submarine cable encapsulates the cumulative expenses borne throughout the entire duration of its use. It comprises the initial outlay for construction, the recurring costs for maintenance, and the expenses related to any essential repairs.

The upfront cost of constructing a submarine cable is substantial, often tallying up to hundreds of millions of dollars [2]. While the cable length chiefly dictates this cost, we also must consider various natural and human-made risks. These risk considerations include geological phenomena such as volcanic eruptions and earthquakes, as well as physical attributes like water depth, seabed slope, and sediment hardness and also human activities like fishing and anchoring, and the requirement to circumnavigate environmentally sensitive or prohibited areas.

The cable incurs regular maintenance costs upon becoming operational, typically hovering around 3-5% of the initial capital expenditure [46]. The need for repairs, precipitated by natural disasters, human activities, or general wear and tear, can inflate these costs. Repairing a single cable break can demand an investment of hundreds of thousands of dollars. Specifically, the life-cycle cost per unit length of a submarine cable at a given location X is denoted as c(X). This life-cycle cost is computed as the sum of the weighted cost elements corresponding to various design considerations mentioned above, as stated in (1):

$$c(X) = \sum_{p \in Q} w_p c_p(X), \tag{1}$$

where Q is the set of all design considerations, $w_p$ is the weight assigned to the cost item associated with the p-th design consideration, and $c_p$ represents the cost attributed to the p-th design consideration at location X. The weight values $w_p$ are determined based on the relative significance of each design consideration in the overall cost, with the process of determining these weights explained in Section V.

The total life-cycle cost, denoted $\mathbb{C}(\gamma)$, for a cable path $\gamma$ (presumed to be Lipschitz continuous [47]), is determined by integrating the unit length cost across the total cable length. The cable path $\gamma$ is represented as a function of arc length s using natural parametrization [48], meaning that every point X on the path can be depicted as X=X(s). Consequently, the cost for a small length ds at location X is c(X)ds. This leads to the representation of the total life-cycle cost $\mathbb{C}(\gamma)$ of the cable path $\gamma$ as shown in (2).

$$\mathbb{C}(\gamma) = \int_0^{l(\gamma)} c(X(s))ds, \tag{2}$$

where $l(\gamma)$ indicates the total length of the cable $\gamma$. More details about submarine cable life-cycle models can be found in [7, 12], which are incorporated by reference herein in their entirety.

III. Problem Formulation

Considering a fixed grid point as starting point A and another fixed grid point as endpoint B in a target area T, it is aimed to design a cable path $\gamma$ connecting A and B with the minimal total life-cycle cost $\mathbb{C}^{min}(\gamma)$. Therefore, the problem is formulated as $$\min_\gamma \mathbb{C}(\gamma) = \min_\gamma \int_0^{l(\gamma)} c(X(s))ds, \tag{3}$$

$$\text{subject to: } \gamma(A) = A, \gamma(B) = B.$$

IV. The Fast Marching Method

This section describes how the FMM for submarine cable path planning is implemented based on the models discussed in Section II to solve the problem formulated in Section III.

A. The Sequential FMM

As mentioned in [10, 12, 26], the formula (3) can be transformed into a nonlinear partial differential equation known as the Eikonal equation. This equation is can be used in wave propagation modeling and analyses and can describe a broad range of physical phenomena [11, 49, 50]. Given the complexity of the Eikonal equation, an analytical solution is seldom available. Thus, a numerical method can be employed to extract a numerical solution and utilize FMM to seek the optimal cable path by solving the Eikonal equation.

The general Eikonal equation has the following form.

$$\|\nabla u(x)\| f(x) = 1, x \in \Omega \backslash \Gamma, \tag{4}$$

$$\text{subject to: } u(x) = 0, x \in \Gamma \subset \Omega,$$

where $\Omega$ is the target domain in $\mathbb{R}^n$, $\Gamma$ is the initial interface (or source node), $f(x)$ is the speed function with $f(x) > 0$, and $\|\cdot\|$ denotes the Euclidean norm (L2-norm). The physical meaning of the solution u(x) to (4) is the shortest time required to travel from the initial interface (or source node) to point x within the computational domain x at speed defined by the function $f(x)$. In the special case where $f(x)=1$, the solution to (4) represents the distance map within the computational domain $\Omega$.

For the submarine cable path planning scenario with a starting point A and endpoint B in a target area T, the Eikonal equation can be written as:

$$\|\nabla \phi(X)\| = c(X), X \in \mathbb{M} \backslash A, \tag{5}$$

$$\text{subject to: } \phi(A) = 0,$$

where X is the grid point on the triangulated manifold $\mathbb{M}$ of target area T, $\phi(X)$ is the minimal total life-cycle cost of a cable path from the starting point A to the point X, and c(X) is the life-cycle cost of point X as defined in (1).

Figure 2B:
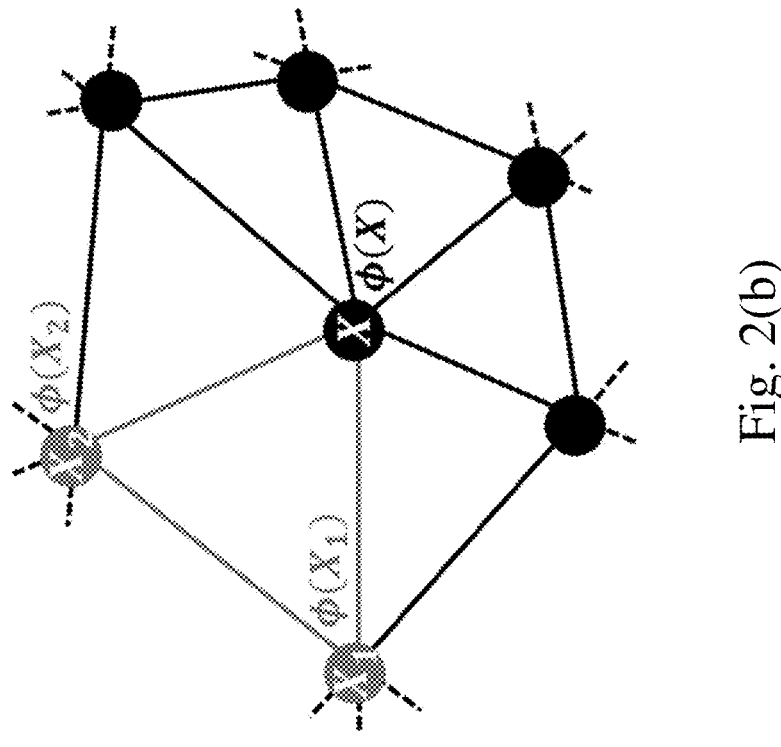
FIG. 2(a) and FIG. 2(b) show two different grids according to an example.
Figure 2A:
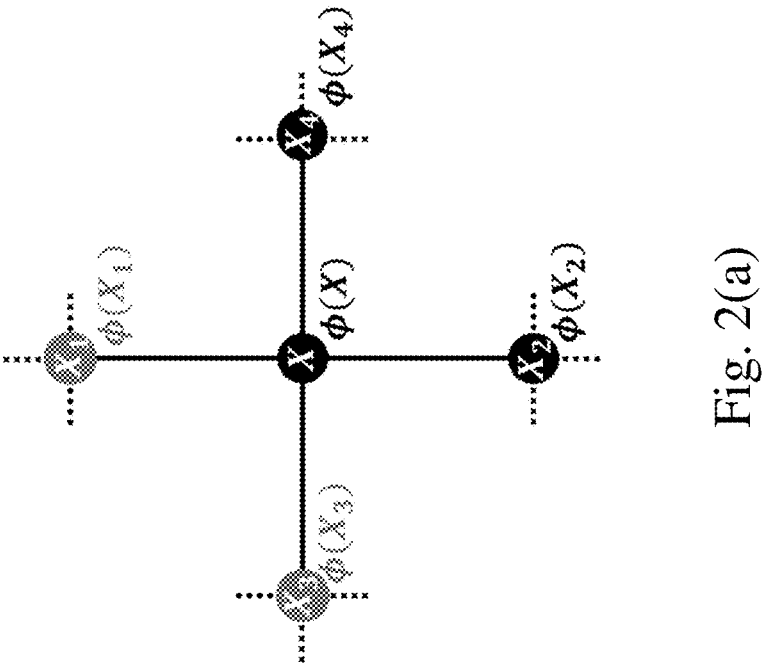

To solve (5), taking a two-dimensional orthogonal grid (with a grid spacing h) as an example (see FIG. 2(a)), and replacing the gradient term on the left side of (5) with a first-order approximation yields [49]:

$$\max(\phi(X) - \phi(X_1), \phi(X) - \phi(X_2), 0)^2 + \tag{6}$$

$$\max(\phi(X) - \phi(X_3), \phi(X) - \phi(X_4), 0)^2 = \frac{h^2}{c(X)^2}.$$

Assuming $\phi(X_1)=\min(\phi(X_1), \phi(X_2))$, $\phi(X_3)=\min(\phi(X_3), \phi(X_4))$ then:

$$(\phi(X) - \phi(X_1))^2 + (\phi(X) - \phi(X_3))^2 = \frac{h^2}{c(X)^2}. \tag{7}$$

is obtained.

By further solving (7) [49], the solution is derived:

$$\phi(X) = \begin{cases} \dfrac{\phi(X_1) + \phi(X_3) + \sqrt{\dfrac{h^2}{c(X)^2} - (\phi(X_1) + \phi(X_3))^2}}{2}, & \text{for } |\phi(X_1) + \phi(X_3)| \le \dfrac{h}{c(X)}, \\[4mm] \min \phi(X_1), \phi(X_3)) + \dfrac{h^2}{c(X)^2}, & \text{for } |\phi(X_1) + \phi(X_3)| \le \dfrac{h}{c(X)} \end{cases} \tag{8}$$

Now considering the triangulated manifold of the Earth's surface model mentioned in Section II-A, FMM is implemented on the triangulated manifold (see FIG. 2(b)) to solve the Eikonal equation.

For the triangle comprises of the grid points $X_1$, $X_2$, and $X$ in FIG. 2(b), one has [51]:

$$\langle \nabla \phi(X), \overrightarrow{XX_i} \rangle \approx \phi(X) - \phi(X_i), \, i \in \{1, 2\}, \tag{9}$$

where $\langle \cdot \rangle$ denotes the inner product of vectors, and $\overrightarrow{XX_i}$ represents the vector from point X to point $X_i$.

In this context, the Eikonal equation can be approximated as the following quadratic equation:

$$(\alpha^T \mathcal{P}\alpha)\phi(X)^2 + (2\alpha^T \mathcal{P}\beta)\phi(X) + \beta^T \mathcal{P}\beta = 1/c(X)^2, \tag{10}$$

where $\alpha = [1; 1]$, $\beta = -[\phi(X_1); \phi(X_2)]$, $\mathcal{P} = (Q\,Q^T)^{-1}$, $Q = [X-X_1; X-X_2]$. To be more precise, $Q$ represents the two side vectors of a triangle that lies on a plane. In particular, the first column of vectors represents the vector from grid point X to $X_1$, while the second column represents the vector from grid point X to $X_2$. These vectors originate from grid point X and form a matrix $Q$, which can be considered a matrix in a coordinate system with X as the origin. $\mathcal{P}$ is a commonly used geometric quantity that denotes the length ratio of the inner bisector of the angle formed by three grid points on the plane. Specifically, $\mathcal{P}$ represents the ratio of the lengths of the bisectors of the interior angles of a triangle.

By solving (10), one derives the solution of (5). By iteratively updating the $\phi$-values of grid points with unknown values, using the $\phi$-values of neighboring grid points with known values, the FMM is able to propagate forward and compute solutions efficiently. More details are provided in [11, 49-51], which are incorporated by reference herein in their entirety.

The implementation process of SFMM for submarine cable path planning is described in the following two-stage procedure.

1) Launch a wave from the initial point A, which spreads outwards until it reaches the final point B. As it expands, each point is assigned a value equal to the accumulated life-cycle cost from A to that point. This is done by setting the speed of expansion from each grid point as the inverse of its life-cycle cost.

2) Commence a reverse journey from B back to A, utilizing the life-cycle cost data collected in the first step. This does not necessarily mean revisiting the grid points in a reverse sequence. The FMM enables the reverse path to traverse the edges of the triangulated manifold in a direction that corresponds to the steepest descent in $\phi(X)$.

Algorithm 1 provides the pseudocode of SFMM.

---

Algorithm 1: The SFMM for point-to-point submarine cable path planning.

---

Input: Starting point A and endpoint B, $w_p$ and $c_p(X)$ for $p \in \mathcal{Q}$, $X \in \mathbb{M}$.
Output: The optimal cable path $\gamma$ connecting A and B with minimal total life-cycle cost.

1 Initialization: $\phi(X) = \infty$ for all $X \in \mathbb{M} \backslash A$, $\phi(A) = 0$;
2 $\mathcal{S} = \{X | X \in \mathbb{M} \backslash A\}$ // the set of far grid points that are unprocessed;
3 $C = \{A\}$ // the set of accepted grid points, where only the starting point A is involved:
4 $\mathcal{N} = \emptyset$ // the set of considered grid points that are neighboring to the grid points in $C$
5 Find the nearest neighbors (one grid point away) of A and move them to $\mathcal{N}$ :
6 while $\mathcal{N} \neq \emptyset$ do
7 | Calculate $\phi$ values for every grid point in $\mathcal{N}$ using the grid points in $C$ and (10):
8 | Find $X^{min} \in \mathcal{N}$ with smallest $\phi(X^{min})$, if there are more than one grid points with $\phi(X^{min})$, pick o
9 | Move $X^{min}$ from $\mathcal{N}$ to $C$ :
10 | for every nearest neighbor (one grid point away) grid point X' of $X^{min}$ is $\mathcal{S}$ do
11 | | Move X' from $\mathcal{S}$ to $\mathcal{N}$ :
12 | end
13 | for every neighbor grid point X" of $X^{min}$ in $\mathcal{N}$ do
14 | | for every triangle t on the manifold of T whose vertexes contains X" do
15 | | | Calculate $\phi_t(X")$ on the triangular patch. using the grid points in $C$ and (10):
16 | | end
17 | | Find the minimal $\phi_t(X")$ and write down as $\phi^{new}(X")$:
18 | | $\phi(X") = \min(\phi(X"), \phi^{new}(X"))$:
19 | end
20 end

B. An Adaptive Parallel FMM (APFMM) for Submarine Cable Path Planning

The parallelization approaches of FMM based on DDM in various existing publications [43-45] are similar to each is to do the parallelization by performing SFMM independently on each sub-domain. To illustrate the parallelization process in detail, the overlapping DDM depicted in FIGS. 3(a) to 3(c) can be used as an example, and the implementation of parallel FMM in $T_1$ is described in Table I.

TABLE I

| The implementation of parallel FMM in sub-domain $T_1$. | |
| --- | --- |
| Step | Actions |
| (a) | Initialize by calculating the $\phi$-value at each grid point on the interface (or source node), labeling them as accepted. Adjacent grid points to these accepted ones are regarded as considered while the remaining ones (including the grid points in the ghost layer$g_1$) are classified as far. Assign an infinite $\phi$-value to all considered and far grid points. |
| (b) | Determine the $\phi$-value for each considered grid point by solving (10). |
| (c) | Inspect if the $\phi$-value of an accepted grid point within the ghost layer has been replaced by a smaller value, say $\phi'$. If true, rollback by designating all grid points in $T_1 \cup g_1$ with $\phi$-value not less than $\phi'$ as considered. |
| (d) | Identify the grid point X' with the minimal $\phi$-value in $T_1 \cup g_1$ and mark it as accepted. |
| (e) | Tag all the far grid points in $T_1 \cup g_1$ that are adjacent to X' as considered. |
| (f) | Recompute the $\phi$-value for all the considered grid points in $T_1 \cup g_1$ by solving (10). |
| (g) | Verify if X' is within $b_i$ and if so, interact with adjacent sub-domains whose ghost layers overlap with $b_i$, updating the status of X' in the relevant sub-domains. |
| (h) | Repeat Steps (c)-(f) until all the grid points in $T_1$ have been denoted as accepted. |
| (i) | Pause until the other sub-domains $T_i$, $i \in \{2, 3, 4\}$ have marked all their local grid points X, $X \in T_i$ as accepted. Meanwhile, if a grid point in $g_i$ is updated with a different $\phi$-value by other sub-domains, revert to Step (c). | other in that they all involve the two key steps: (1) domain decomposition and (2) parallelization in each sub-domain.

1) The first step: domain decomposition: In this step, the initial computation domain is broken down into several sub-domains. In this context, the target area T, which is the initial computational domain in (5), is divided into n sub-domains $T_1, \ldots, T_n$ and assigned to n threads with each sub-domain $T_i$ corresponding to one thread labeled $\pi_i$, $i \in \{1, 2, \ldots, n\}$. In this context, the initial manifold $\mathbb{M}$ is also divided into n sub-manifolds in the meanwhile, with each sub-manifold $\mathbb{M}_i$ corresponding to the sub-domain $T_i$.

Each sub-domain $T_i$ is externally surrounded by a ghost layer $g_i$ and features a border layer $b_i$ that is situated within its domain that shares a border with its ghost layer $g_i$. The border layer $b_i$ of $T_i$ is overlapped with its neighboring sub-domain's ghost layer. FIGS. 3(a), 3(b) and 3(c) illustrate the overlapping DDM of two sub-domains. FIG. 3(a) demonstrates the decomposition of initial domain T into two sub-domains, $T_1$ and $T_2$. The border layer $b_1$ within $T_1$ overlaps with the ghost layer $g_2$ that surrounds $T_2$, and likewise, the border layer $b_2$ within $T_2$ overlaps with the ghost layer $g_1$ that surrounds $T_1$, see in FIG. 3(b). FIG. 3(c) represents the data exchange process between $T_1$ and $T_2$. Specifically, the grid points located within the overlapping regions $b_1/g_2$ and $b_2/g_1$ (as depicted in FIG. 3(b)) may have their $\phi$-values updated either by the FMM process in $T_1$ or the FMM process in $T_2$. This update will only occur if the updated value is smaller than the existing value, thereby adhering to the FMM's upwind principle.

2) The second step: parallelization in each sub-domain: Once the domain has been decomposed, then the second step The parallelism in Steps (a) and (c)-(f) with those in the SFMM is apparent, serving as the initialization and propagation stages, respectively. However, a distinguishing feature in parallel FMM is including a rollback operation in Step (c) for grid points with $\phi$-values exceeding the newly computed $\phi'$. This precaution is necessary since O-values surpassing $\phi'$ may be inaccurate due to their potential reliance on $\phi'$, considering that FMM propagates from the smaller values to larger values [11]. Thus, to ensure algorithmic consistency, it is necessary to revert the status of the corresponding grid points with $\phi$-values exceeding $\phi'$ for a fresh computation of their $\phi$-values. Notably, during each rollback operation, the labels of the grid points (those with $\phi$-values surpassing $\phi'$) are merely altered from accepted to considered, without tampering with their $\phi$-values. The rationale behind this approach is that any future update will either minimize its value or leave it intact, as stated by Herrmann [16]. By abiding by this principle, significant computation time can be saved as it obviates the need to recompute the $\phi$-values of these points.

However, these rollback instances might occur repeatedly even for the same grid points, thereby imposing additional communication demands and increasing computational expenses due to the necessity of visiting all the grid points within the sub-domain $T_1$ and the ghost layer $g_1$ for every rollback. Therefore, the number of rollbacks significantly impacts parallel efficiency, and the frequency of their occurrence is related to the method used for sub-domain partitioning [20, 52].

As a simple two-dimensional illustrative example of (4), $$T = [0, 5]^2, c(X) \equiv 1, A = (0, 0), \phi(A) = 0, \qquad (11)$$

where it is considered the problem of cable path planning in a domain T=[0, 5]$^2$ with the starting point as A=(0, 0) and it is assumed that the propagation speed is constant throughout the domain, with c(X)≡1. This simplifying assumption ignores the fact that different grid points may have different life-cycle costs. However, it allows to analyze the optimal region decomposition method straightforwardly.

Figure 4B:
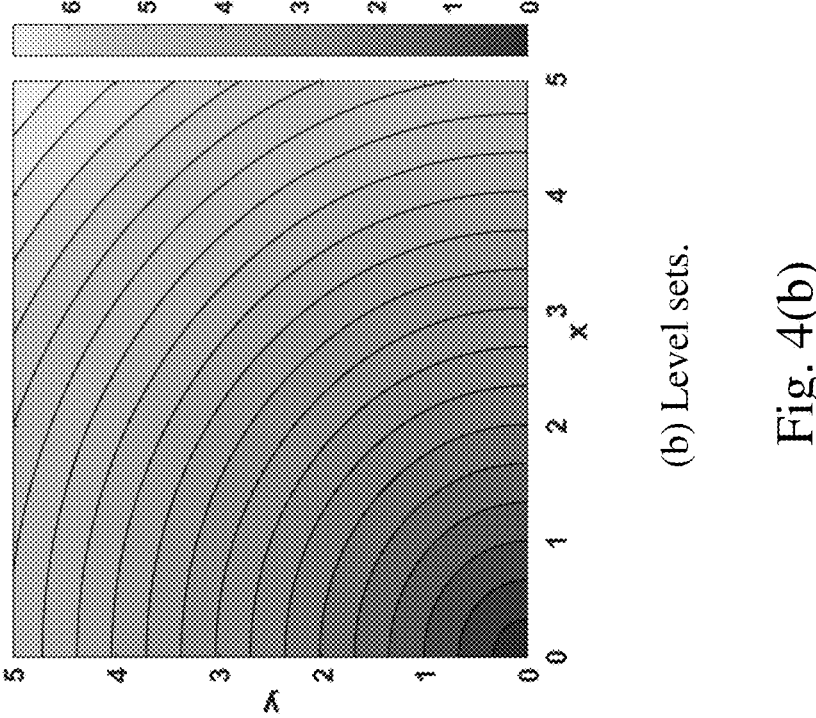
FIG. 4(b) shows a corresponding level sets.
Figure 4A:
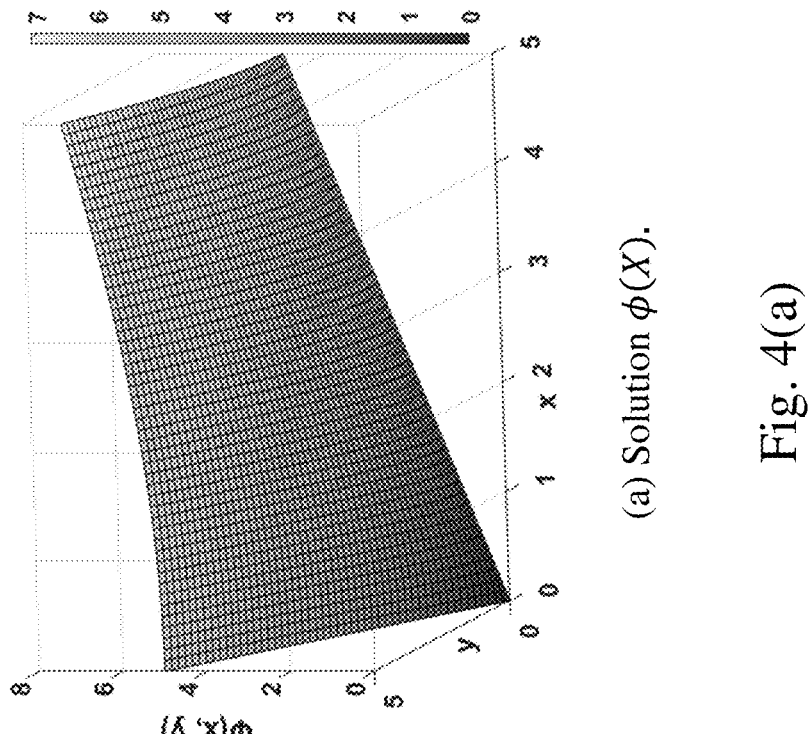
FIG. 4(a) shows a solution $\phi(X)$ to an equation according to an embodiment of the invention.
Figures 5A, 5B:
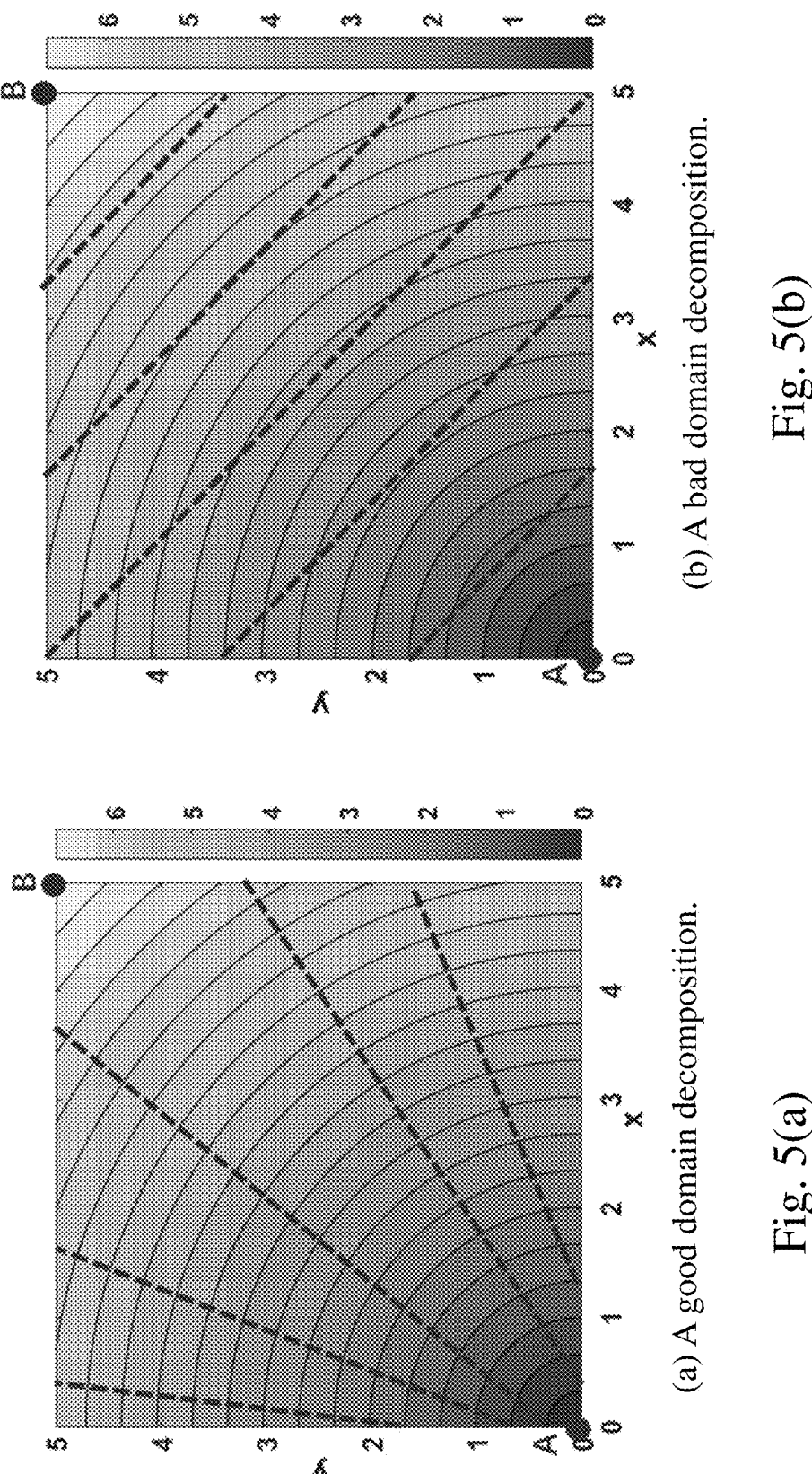
FIG. 5(a) and FIG. 5(b) show different domain decompositions according to an example.

FIG. 4(a) and FIG. 4(b) illustrate the solution φ(X) to (11) and its corresponding level sets, where FMM commences from the starting point A, propagating fastest along the characteristic curves perpendicular to the level sets of φ(X), until it reaches the endpoint B=(5, 5). On this basis, an optimal decomposition occurs when all boundaries of the sub-domains align with these characteristic curves, as shown in FIG. 5(a). In such a scenario, the propagation does not cross the boundaries frequently, eliminating additional data communication burden in a way. This burden may arise from repeated access (both reading and writing) to grid points in overlapping regions and potential rollback operations. However, if all the boundaries of sub-domains are orthogonal to the characteristics [53], as depicted in FIG. 5(b), computation tends to become serial, irrespective of the domain decomposition.

It is worth noting that in practice, the life-cycle cost c(X) for each grid point within the domain varies due to different laying conditions at different locations, resulting in varying life-cycle costs. Therefore, the level set of the target area is often very tortuous and irregular, see FIG. 6(a) and FIG. 6(b), which are different from the level sets shown in FIG. 5(a) and FIG. 5(b), making it challenging to divide sub-domains exactly along the characteristic curves.

However, since our objective is to connect the given starting point A and endpoint B on $\mathbb{M} \in \mathbb{R}^3$, it is predictable that dividing sub-domains along the direction connecting A and B is better than dividing them perpendicular to the direction connecting the origin and destination. This is because dividing the sub-domains along the fastest propagation direction of the FMM can reduce the communication frequency and the number of rollbacks, resulting in higher parallelization efficiency.

Figures 6A, 6B:
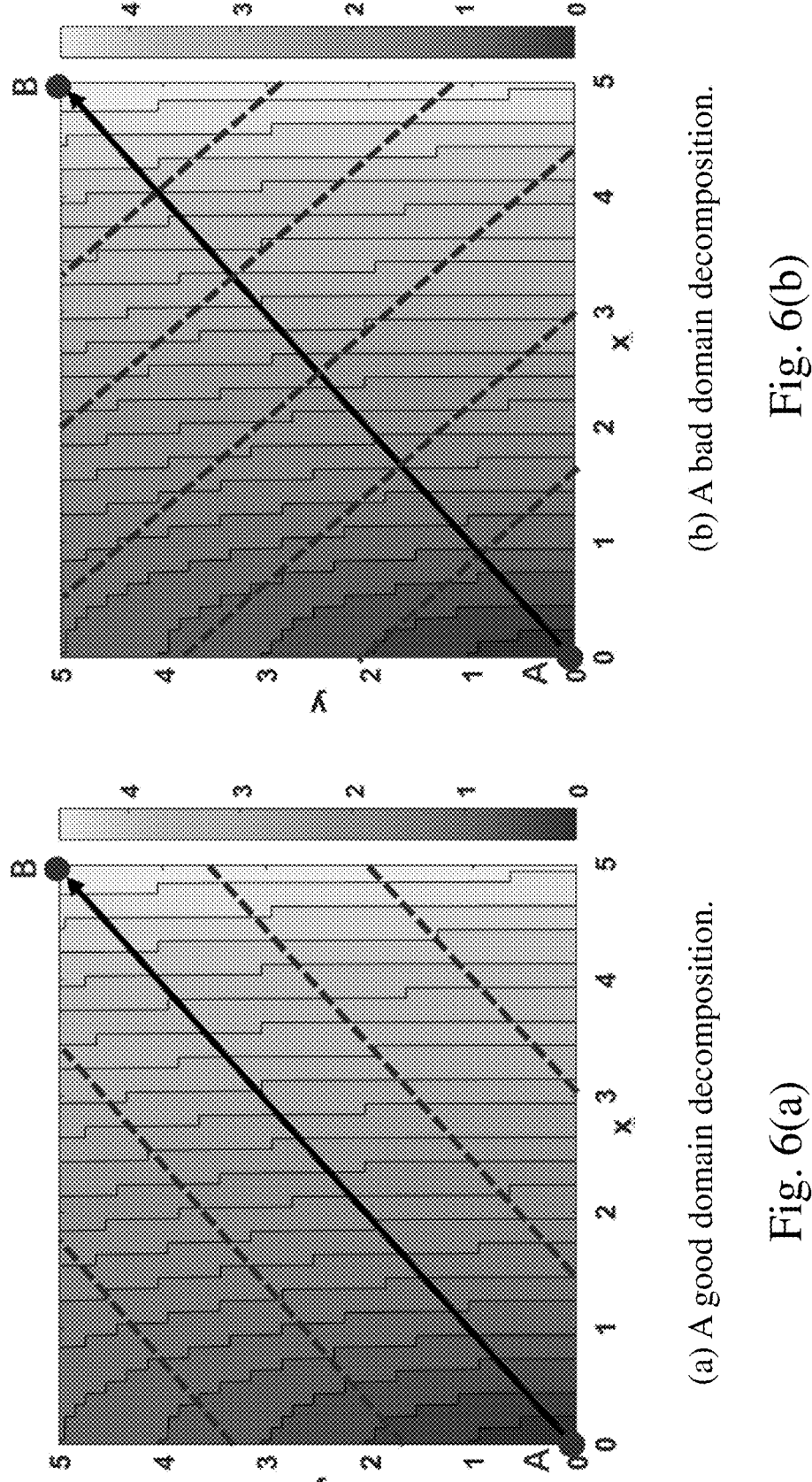
FIG. 6(a) and FIG. 6(b) show different domain decompositions according to an example.

In FIG. 6(a) and FIG. 6(b), the vector that stretches from the starting point A to the endpoint B, as depicted by the black arrowed line, is observed. Then the domain is decomposed in different ways: parallel and perpendicular to this direction, as shown in FIG. 6(a) and FIG. 6(b) respectively. It's apparent that the number of sub-domains that need to be crossed for FMM to propagate from A to B in FIG. 6(b) exceeds that in FIG. 6(a).

On this basis, the embodiments of the invention propose an adaptive parallel FMM algorithm based on adaptive domain decomposition and MRA. Table II and Algorithm 2 provide the details of this algorithm and its pseudocode, respectively.

TABLE II

Implementation of APFMM for point-to-point submarine cable path planning.

| Step | Actions |
|---|---|
| (A) | Initialize the decomposition index k = 1. Assign an extremely low initial resolution (denoted as R$_1$) to the initial region T. Divide the initial region T into two sub-domains T$_1$ and T$_2$, along the direction defined by the starting point A and the endpoint B (denoted as $\overrightarrow{AB}$). |
| (B) | Allocate the two sub-domains T$_1$ and T$_2$ to two threads, respectively. Execute FMM in parallel from the starting point A for each sub-domain, as described in Table I. Denote the resulting optimal cable path as γ$_1$. |
| (C) | Increase the decomposition index k = k + 1. Define L = {lll ∥ $\overrightarrow{AB}$} as the set of all domain decomposition lines parallel to $\overrightarrow{AB}$. Let $\mathcal{D}_{\gamma_k}$ (l$_x$, l$_y$) denote the distance between two domain decomposition lines l$_x$ and l$_y$ in L that enclose the cable path γ$_k$. The area between two decomposition lines l$_x$ and l$_y$ is denoted as $T_{l_x l_y}$. Identify $l_1^K$ and $l_2^K$ by solving $(l_1^k, l_2^k) = \underset{l_x l_y \in L}{\operatorname{argmin}} \mathcal{D}_{\gamma_{k-1}} (l_x, l_y)$. For the initial area T excluding $T_{l_1^k l_2^k}$, use $T_{l_1^k}$ and $T_{l_2^k}$ to denote the two sub-domains bordering the decomposition lines $l_1^k$ and $l_2^k$, respectively. |
| (D) | Increase the resolution of the area $T_{l_1^k l_2^k}$ (denoted the increased resolution as R$_k$), and further divide it equally into $2^{k-1}$ sub-domains $\left( T_{l_1^k l_3^k}, T_{l_3^k l_4^k}, \dots, T_{l_{3+2^{k-1}-1}^k l_2^k} \right)$, aligned with the direction of $\overrightarrow{AB}$. The decomposition lines are labeled as $l_3^k, l_4^k, \dots, l_{3+2^{k-1}-1}^k$. |
| (E) | Assign these $2^{k-1}$ sub-domains along with the sub-domains $T_{l_1^k}$ and $T_{l_2^k}$ obtained in Step (C) (making a total of $2^{k-1}$ + 2 sub-domains) one-to-one to $2^{k-1}$ + 2 threads. Execute FMM in parallel as described in Table I. Specifically, for each sub-domain, the grid point X* where the path γ$_{k-1}$ first enters this sub-domain is set as the sour of FMM and its corresponding φ-value, φ(X*), is used for the FMM propagation. The resulting optimal cable path is denoted as γ$_k$. |

TABLE II-continued

| Implementation of APFMM for point-to-point submarine cable path planning. |
|---|

| Step | Actions |
|---|---|
| (F) | Reiterate Steps $(C)$–$(E)$ until the region $T_{l_1^k l_2^k}$ achieves the highest possible data resolution, or the total number of sub-domains for the next decomposition $2^k + 2$ surpasses the predetermined maximum number of available threads. |

---

Algorithm 2: Implementation of APFMM for Point-to-Point Submarine Cable Path Planning.

Input: Starting point A and endpoint B, $\omega_p$ and $c_p(X)$ for p $\in$ $Q$, X $\in$ $\mathbb{M}$, the maximum number of available
      threads n, the highest available data resolution $R_h$.
Output: The optimal cable path $\gamma_k$ connecting A and B with minimal total life-cycle cost.
1  Initialization: k = 1 and assign an extremely low initial resolution $R_1$ to the initial region T.
2  Divide the T into two sub-domains $T_1$ and $T_2$ along $\overrightarrow{AB}$;
3  Allocate $T_1$ and $T_2$ to $\pi_1$ and $\pi_2$ respectively;
4  Execute the parallel FMM as shown in Table I for $T_1$ and $T_2$ from A and to get the optimal cable path $\gamma_1$;
5  while the region $T_{l_1^k l_2^k}$ has not achieved the highest possible data resolution and $2^k + 2 < n$ do
6  |  k = k + 1;
7  |  $\left(l_1^k, l_2^k\right) = \underset{l_x l_y \in L}{\operatorname{argmin}} \mathcal{D}_{\gamma_{k-1}}(l_x, l_y)$;
8  |  Increase the resolution of the area $T_{l_1^k l_2^k}$ (denoted as $R_k$):
9  |  Divide $T_{l_1^k l_2^k}$ equally into $2^{k-1}$ sub-domains $\left(T_{l_1^k l_3^k}, T_{l_3^k l_4^k}, \dots, T_{l_{3+2^{k-1}-1}^k l_2^k}\right)$;
10 |  Assign all $2^k$ sub-domains $T_{l_1^k l_3^k}, T_{l_3^k l_4^k}, \dots, T_{l_{3+2^{k-1}-1}^k l_2^k}, T_{l_1^k}$ and $T_{l_2^k}$ one–to–one to $2^{k-1} + 2$ threads
   |  $\pi_1, \pi_2, \pi_3, \dots, \pi_{2^k}$;
11 |  Execute FMM in parallel for all sub-domains as described in Table I to get the optimal cable path $\gamma_k$.
   |     Specifically, for each sub-domain, the FMM propagates from X* with $\phi(X^*)$.
12 end

---

In Step (C) of Table II, two decomposition lines, $$l_1^k$$

and $$l_2^k,$$

which are parallel to $\overrightarrow{AB}$ and possess the minimum distance $$\mathcal{D}_{\gamma_{k-1}}\left(l_1^k, l_2^k\right)$$

between $$l_1^k$$

and $$l_2^k$$

that can enclose the path $\gamma_{k-1}$, are initially identified. As the optimal path $\gamma_{k-1}$ derived in the prior loop is entirely contained within the region $$T_{l_1^k l_2^k},$$

this suggests that the region $$T_{l_1^k l_2^k}$$

holds heightened importance. Consequently, the resolution in the area $$T_{l_1^k l_2^k}$$

is increased, and the area $$T_{l_1^k l_2^k}$$

is partitioned into $2^{k-1}$ equally-sized sub-domains along the direction of $\overrightarrow{AB}$. This ensures that each sub-domain stemming from the area $$T_{l_1^k l_2^k}$$

can maintain an equivalent number of grid points as the resolution increases, thereby facilitating a balanced load distribution among the threads managing these sub-domains as much as possible. For the initial area T outside $$T_{l_1^k l_2^k},$$

it is refrained from increasing the resolution given that the path from the previous loop did not traverse these areas, thereby avoiding unnecessary computational load.

Following the division of all sub-domains, it proceeds to Step (E) of Table II, where the FMM is executed in parallel in each sub-domain, as described in Table I. As the area $$T_{l_1^k l_2^k}$$

between the two decomposition lines $$l_1^k$$

and $$l_2^k$$

encompasses the path $\gamma_{k-1}$, and the distance d between $$l_1^k$$

and $$l_2^k$$

is minimal, it can be guaranteed that at least one grid point on the path $\gamma_{k-1}$ is present in each sub-domain. Given this, and considering the upwind propagation characteristics of FMM [11], the grid point is designated in a sub-domain where the path $\gamma_{k-1}$ first enters in this sub-domain as the source point of FMM propagation in this sub-domain. It's worth noting that for areas outside the decomposition $l_1^k$ and $l_2^k$, namely $T_{l_1^k}$ and $T_{l_2^k}$, it is continued to use the lowest initial resolution $R_1$ rather than reducing the resolution to zero (i.e., removing points within these areas). This is because it cannot be guaranteed that the path obtained in the next loop will not enter these areas.

Figure 7:
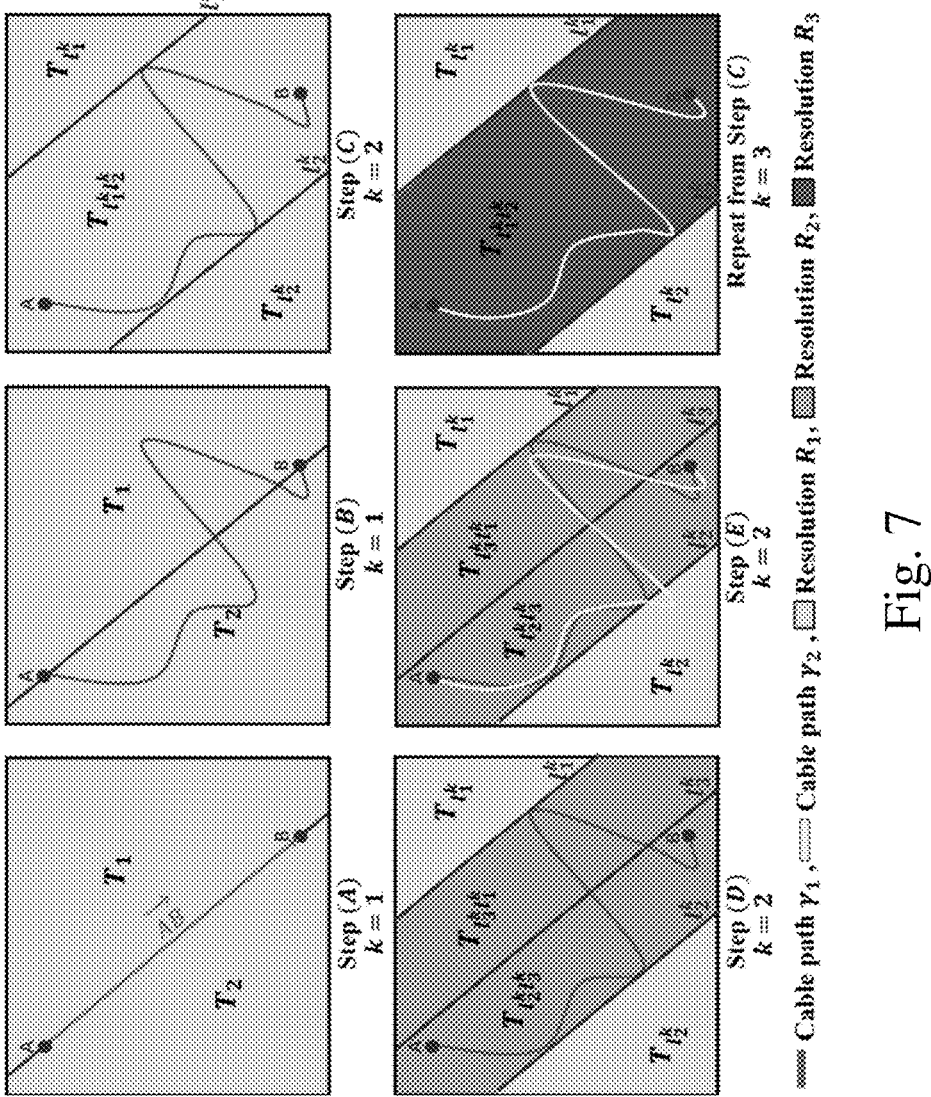
FIG. 7 shows an execution process of Adaptive Parallel Fast Marching Method (APFMM) for submarine cable path planning according to some embodiments of the invention.

FIG. 7 illustrates the execution process of APFMM as detailed in Table II. Each sub-figure is annotated below with the execution steps corresponding to it, as well as the current decomposition index k. Concurrently, the darker the area, the higher its resolution. The darker curve represents the optimal path computed in the initial iteration, while the lighter curve signifies the optimal path determined following the second sub-domain re-decomposition. By continuously repeating Steps (C)-(E) from Table II, the precision and quality of the submarine cable path solution can be progressively enhanced.

V. Application

A. General Information

Figure 8:
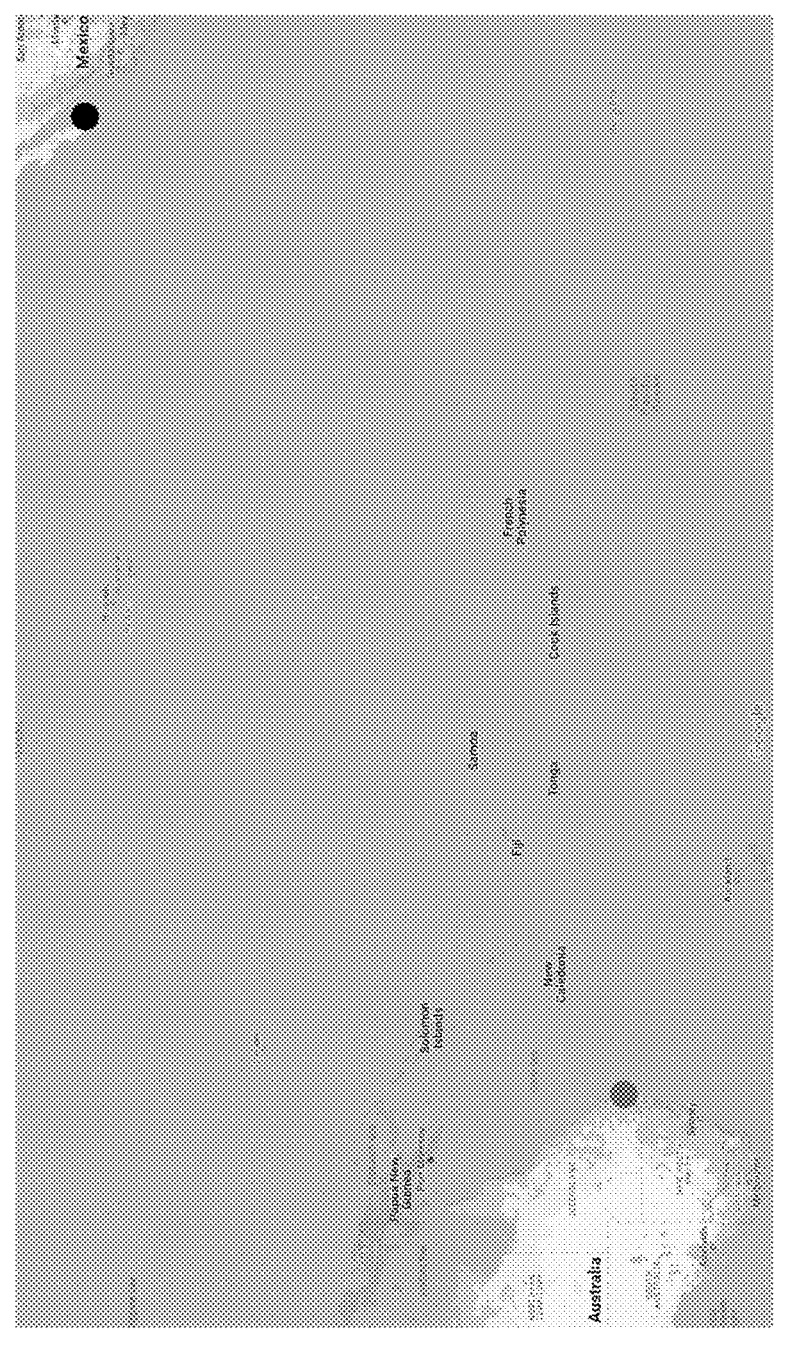
FIG. 8 shows an example target region in Google Earth.

In this section, the application of our APFMM is demonstrated by addressing a practical scenario of point-to-point submarine cable path planning. The starting point of our path is positioned at South Gorge Headland, Australia, located at coordinates (27° 26'13"S, 153° 32'44"E) and represented by a circle in the bottom left side in FIG. 8. Conversely, the endpoint is at the Arch of Cabo San Lucas, Mexico, at coordinates (22° 52'31"N, 109° 53'44"W), denoted by a circle in the top right side. The geographical context of the starting point and endpoint is illustrated in FIG. 8.

In the application, various design considerations are taken into account, and each assigned a specific weight value. These considerations and their corresponding weights are detailed in Table III. More comprehensive information about the cost calculation and the data sources used for these design considerations are provided in [7], which is incorporated by reference herein in its entirety.

TABLE III

| Design considerations and the corresponding weight values | |
|---|---|
| Design considerations | Weight value |
| Basic construction cost | 0.1695 |
| Geological hazards | 0.3852 |
| Seabed slope | 0.1645 |
| Water depth | 0.0215 |
| Anthropological hazards | 0.0739 |
| Protected areas | 0.1851 |

B. Numerical Results

In this section, APFMM is used first to calculate the optimal cable path connecting the starting point A and the endpoint B until the highest available resolution data is reached. FIGS. 9(a) to 9(h) show part of the APFMM solution process, and Table IV shows the detailed results for each implementation cycle of APFMM.

Figure 9A:
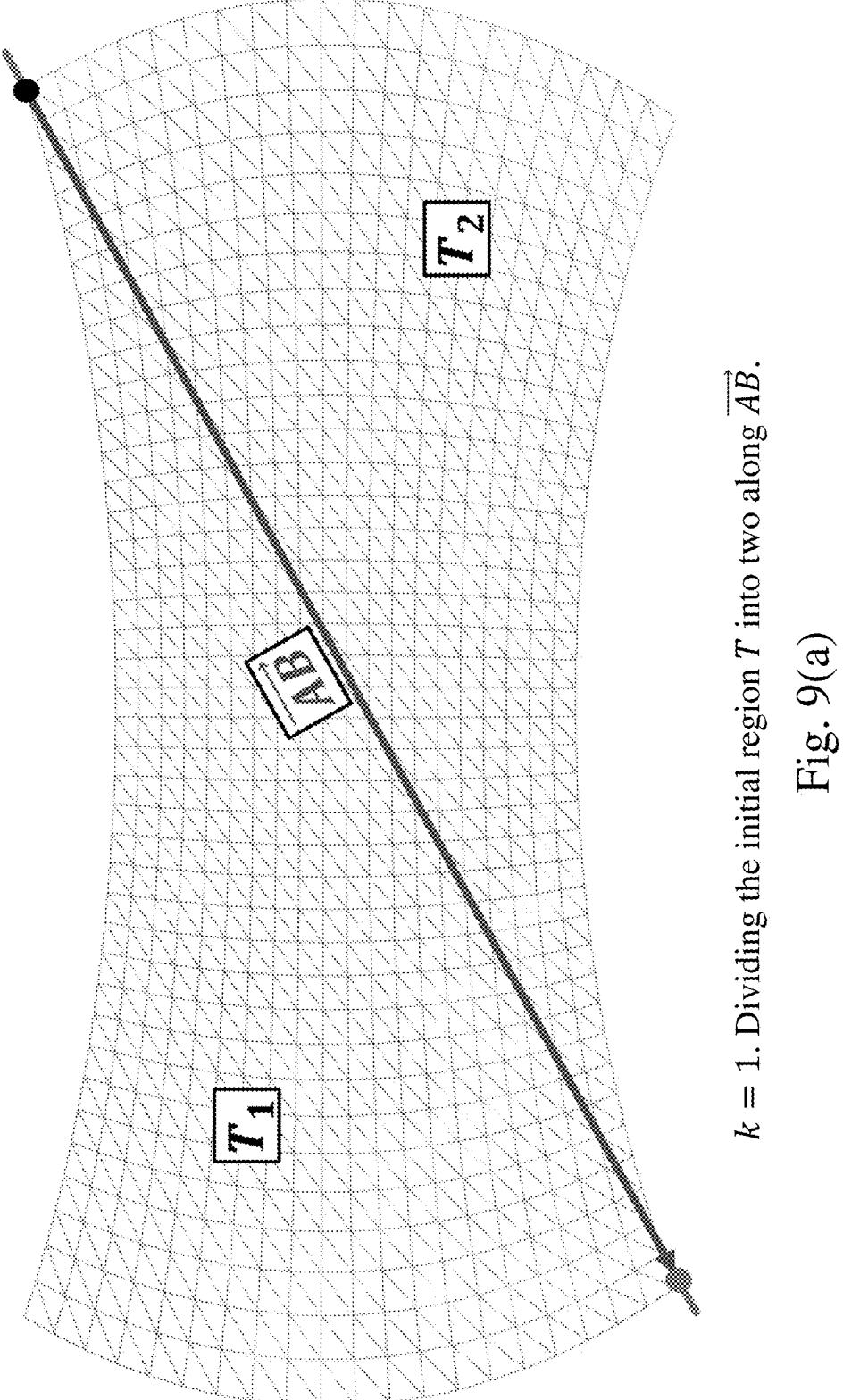
FIGS. 9(a) to 9(h) show part of the APFMM solution process according to some embodiments of the invention.

In FIG. 9(a), a manifold is established for the initial region, T, along the direction connecting the starting point A and the endpoint B, utilizing the lowest resolution $R_1$. The initial region T is subsequently divided into two sub-regions, $T_1$ and $T_2$. By executing FMM in parallel in both $T_1$ and $T_2$, using A as the source, the path $\gamma_1$ is obtained, as depicted in FIG. 9(b).

23

Figure 9B:
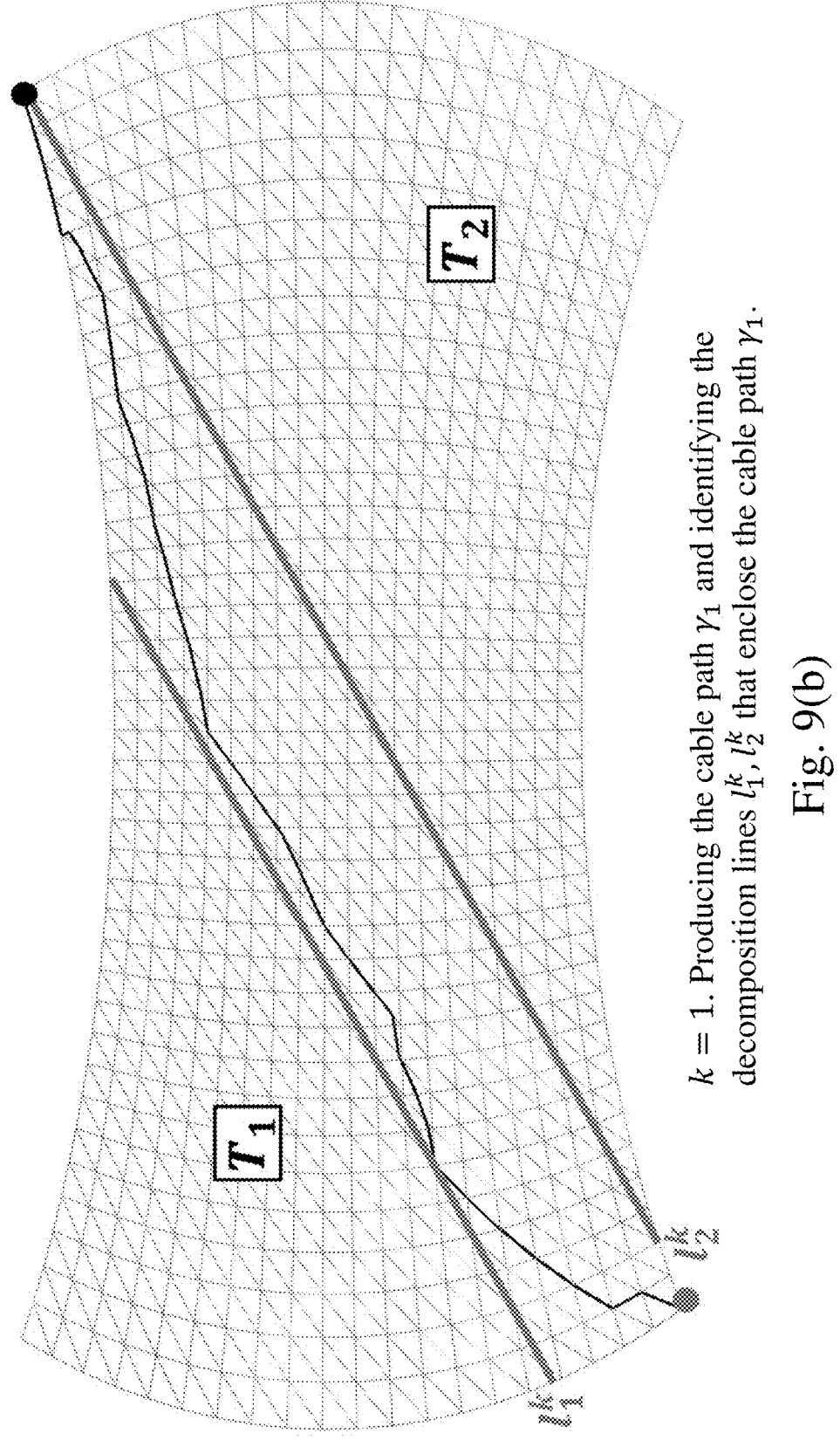

In FIG. 9(b), the partition lines $1_1{}^k$ and $1_2{}^k$, which can encompass the path $\gamma_1$ and are parallel to $\overrightarrow{AB}$, with a minimum distance $d^k$ between each other, are identified. As progressed to FIG. 9(c), the domain decomposition index k is incremented by one and the subsequent decomposition is initiated. The resolution of the region $T_{l_1{}^k l_2{}^k}$ in FIG. 9(b) is increased by a factor of two (denoted as $R_2$), and the region $T_{l_1{}^k l_2{}^k}$ is equally divided into two sub-domains marked as $T_{l_1{}^k l_3{}^k}$ and $T_{l_3{}^k l_2{}^k}$.

Figure 9C:
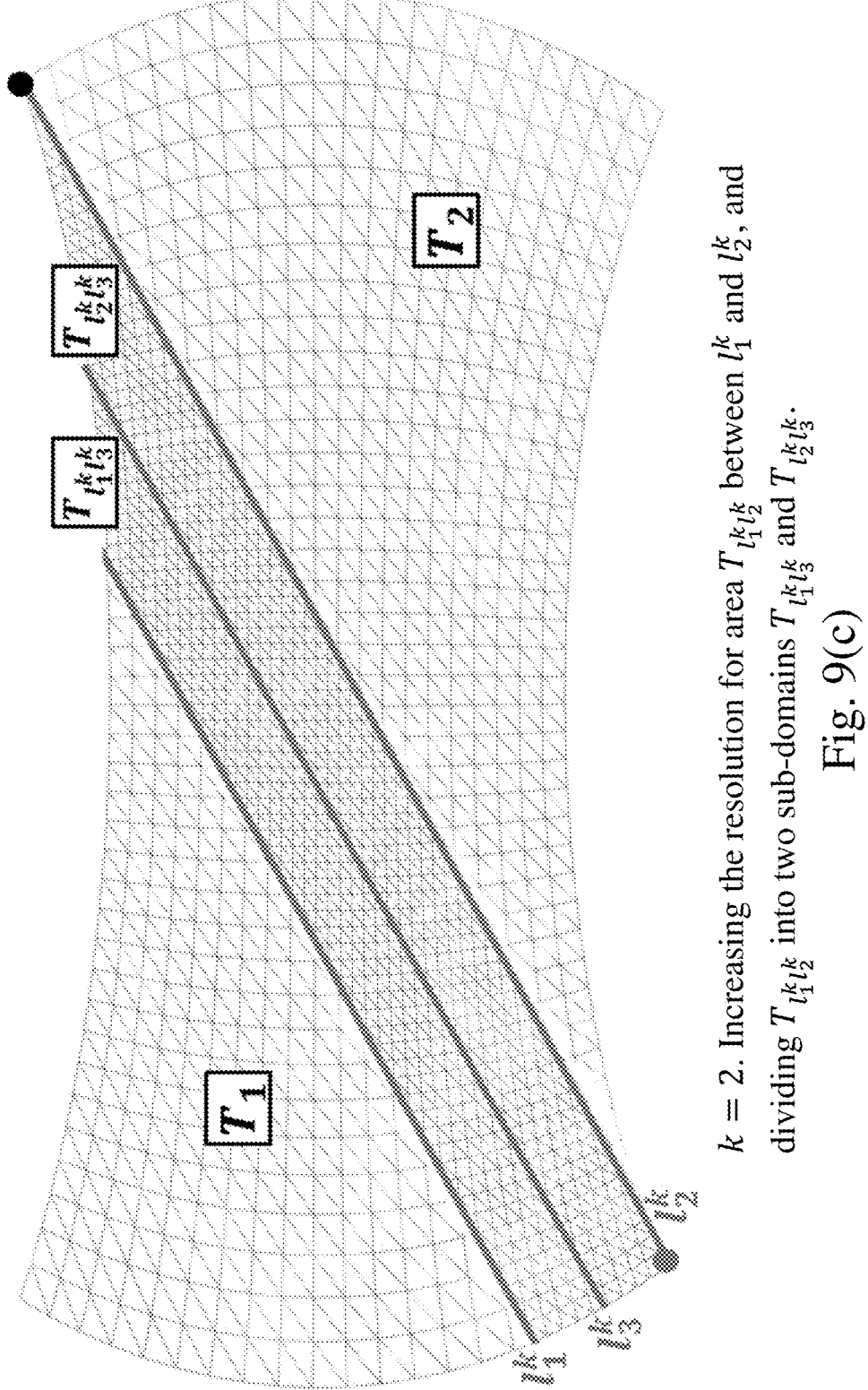
Figure 9D:
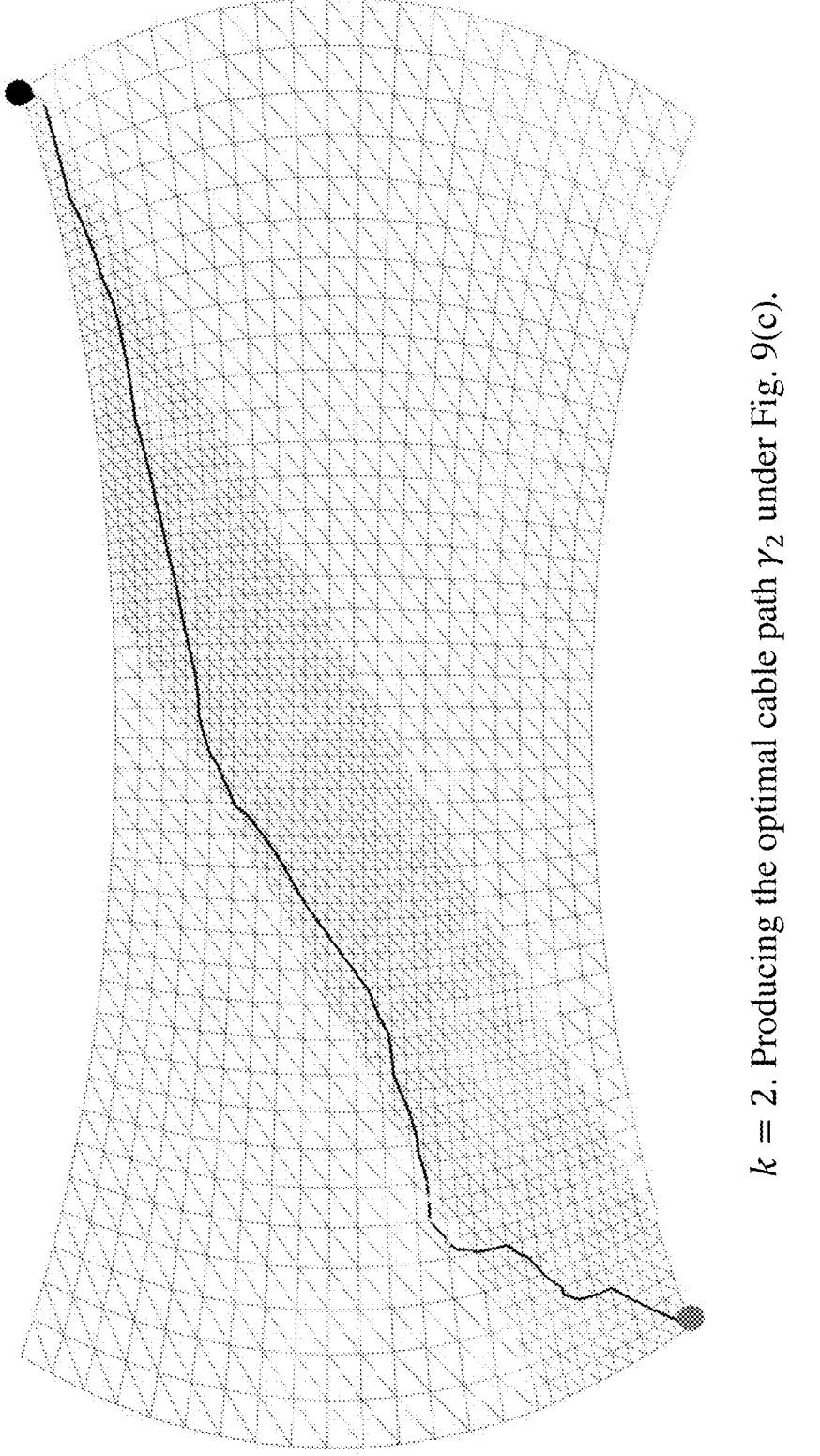
Figure 9E:
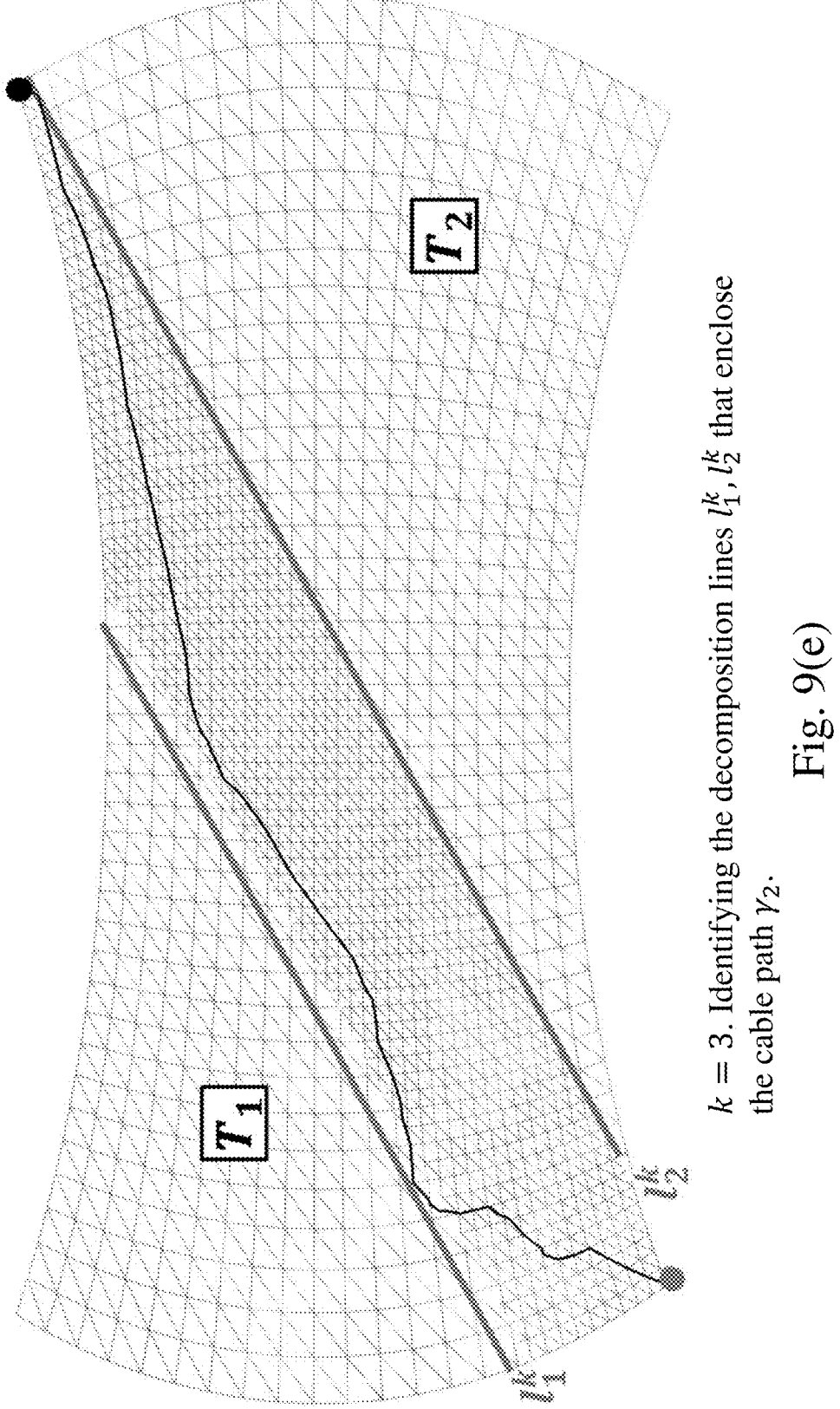
Figure 9F:
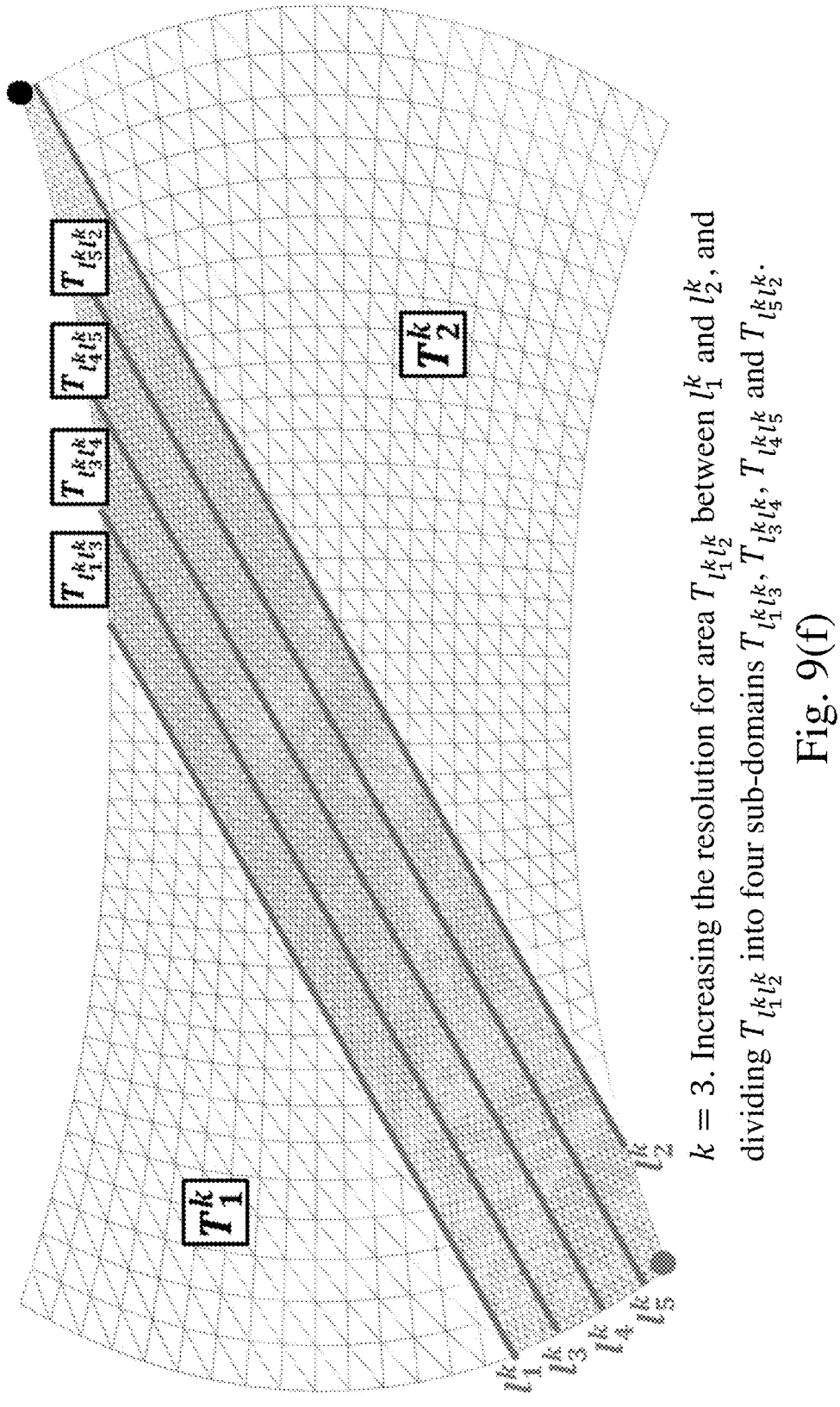
Figure 9G:
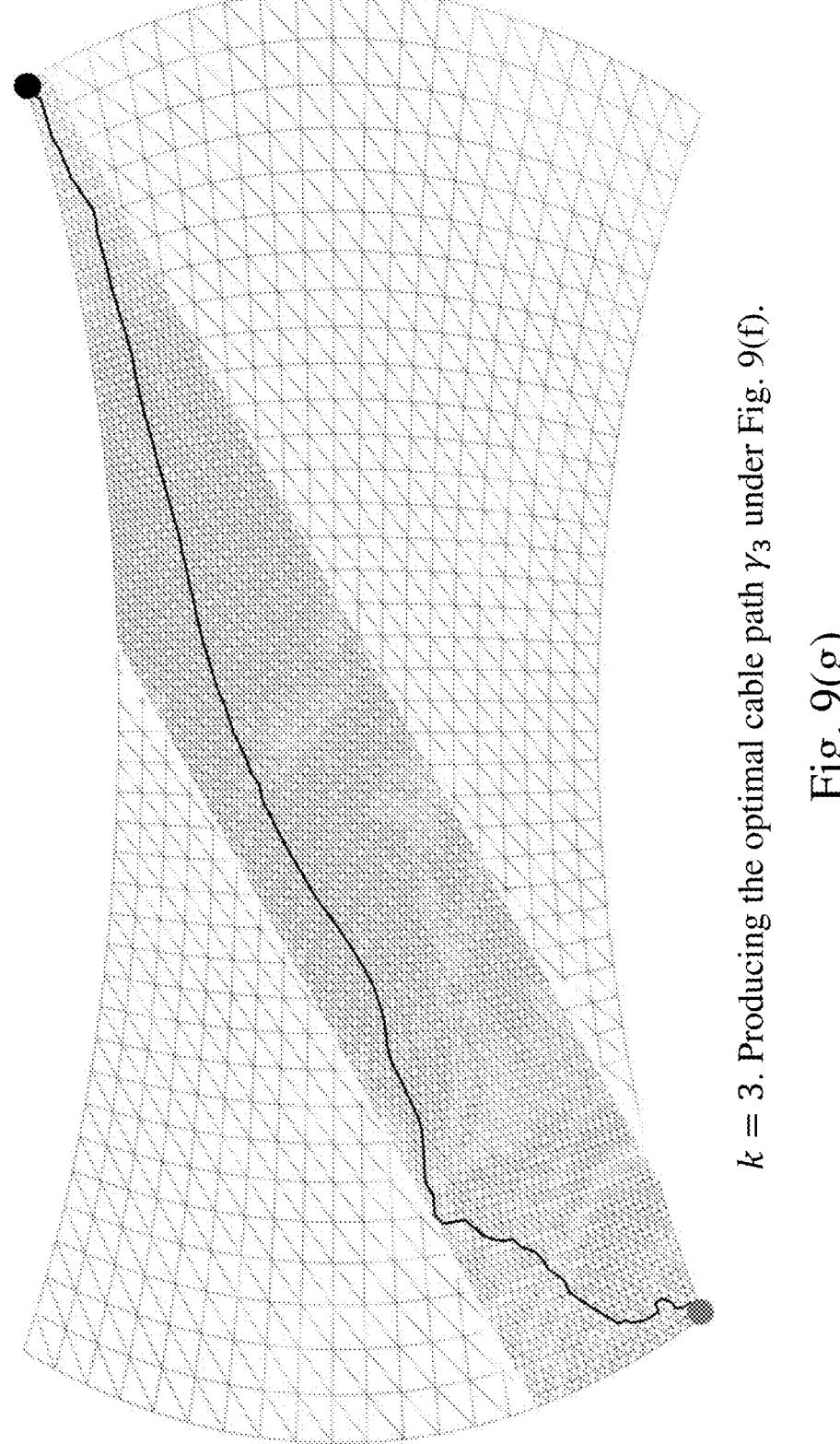

By executing the FMM in parallel across all four sub-regions in FIG. 9(c), the path $\gamma_2$ is derived, as illustrated in FIG. 9(d). The operations conducted in FIG. 9(e) and FIG. 9(f) mirror those in FIG. 9(b) and FIG. 9(c). However, compared to FIG. 9(b), the resolution of the region $T_{l_1{}^k l_2{}^k}$, situated between the partition lines $1_1{}^k$ and $1_2{}^k$ in FIG. 9(f), is further amplified (denoted as $R_3$) and subdivided into four equidistant sub-domains. FIG. 9(g) presents the optimal path $\gamma_3$ obtained under the sub-domain decomposition scenario and resolution settings depicted in FIG. 9(f).

Figure 9H:
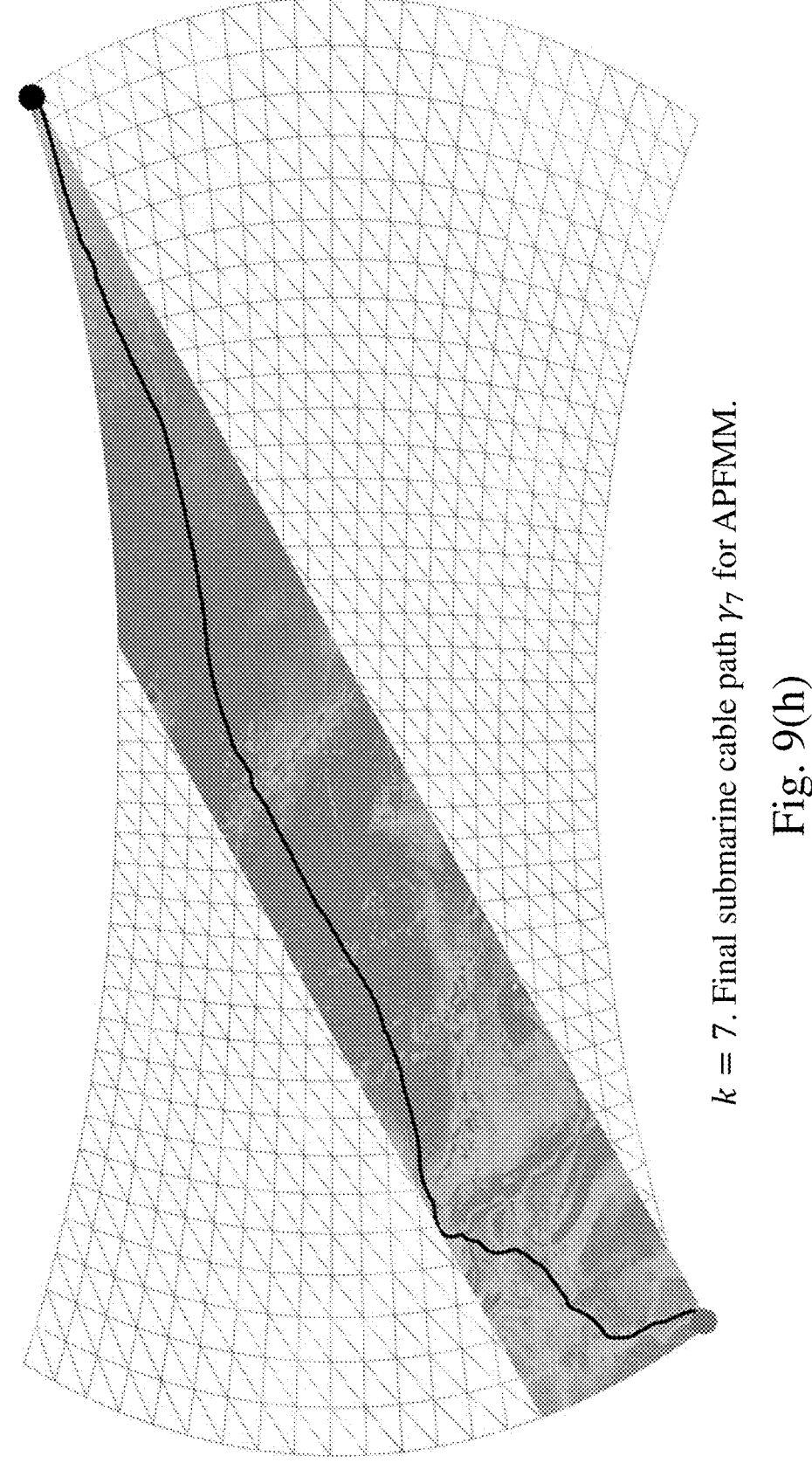

Ultimately, by perpetually executing the sequence of "re-decomposition—resolution enhancement—path solving" (i.e., from FIG. 9(b) to FIG. 9(d)), the final submarine cable path is obtained as depicted in FIG. 9(h).

It should be noted that even though the resolution of the region $$T_{l_1{}^k l_2{}^k}$$

between $$l_1{}^k$$

and $$l_2{}^k$$

consistently increases (thus leading to an expansion in the number of grid points in this region), the number of sub-domains divided between the decomposition lines $$l_1{}^k$$

and

24

$$l_2{}^k$$

concurrently escalates. This strategy ensures a minimal load disparity between the thread responsible for the sub-domains within $$l_1{}^k$$

and $$l_2{}^k,$$

and the threads responsible for the sub-domains outside $$l_1{}^k$$

and $$l_2{}^k$$

(which consistently utilize the initial low resolution $R_1$). Maintaining a balanced load across all threads aids in enhancing parallel efficiency and accelerating the implementation of APFMM.

TABLE IV

SIMULATION RESULTS FOR APFMM.

| Decomposition index κ | Total length of cable path $\gamma_\kappa$ (km) | Total life-cycle cost of cable path $\gamma_\kappa$ (million $) | Average distance between two adjacent grid points (km) | Number of sub-domains (threads) |
|---|---|---|---|---|
| 1 | 14200.00 | 397.6001 | 53.7174 | 2 |
| 2 | 14545.49 | 407.2737 | 22.5447 | 4 |
| 3 | 14566.50 | 407.8620 | 9.5867 | 6 |
| 4 | 14518.82 | 406.5269 | 2.1034 | 10 |
| 5 | 14533.46 | 406.9368 | 0.4277 | 18 |
| 6 | 14515.52 | 406.4344 | 0.1545 | 34 |
| 7 | 14516.94 | 406.4927 | 0.0671 | 66 |

Figure 10:
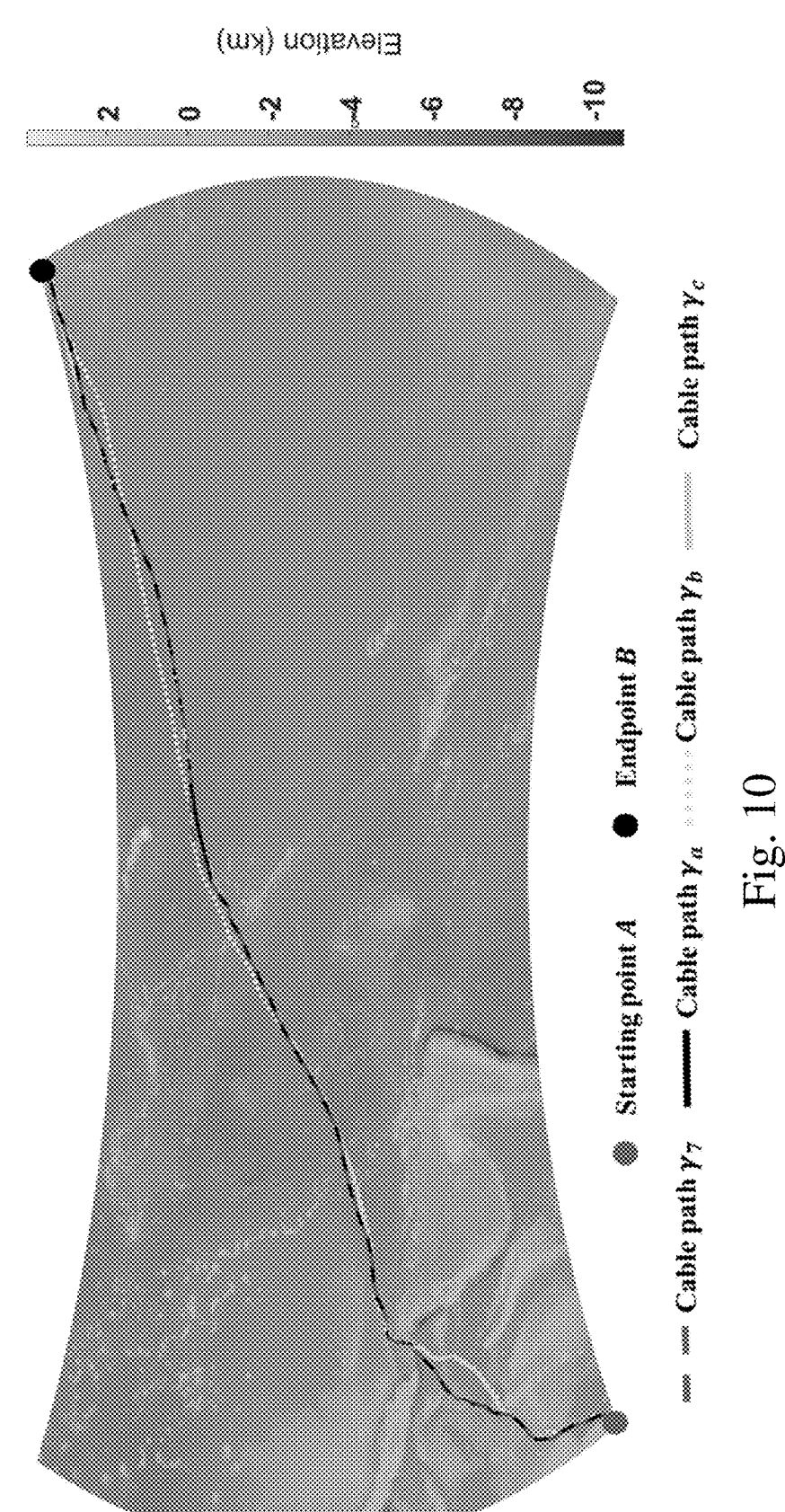
FIG. 10 shows comparison results between the APFMM according to some embodiments of the invention and three other methods.

To analyze the advantage of our APFMM that combines adaptive DDM with MRA, two parallel FMMs based on general domain decomposition, named PFMM-I and PFMM-II, are introduced, and applied in this case to plan the cable path connecting A and B. Specifically, PFMM-I uses horizontal and vertical domain decomposition lines to evenly divide the initial domain T into 66 rectangular sub-domains and assigns them to 66 threads (the same number of threads used by APFMM in the last loop before termination). PFMM-II uses domain decomposition lines perpendicular to $\overrightarrow{AB}$ to divide the initial domain T into 66 sub-domains and assigns them to 66 threads. Additionally, the SFMM is included for comparison. The comparison results are shown in FIG. 10 and Table V, where paths $\gamma_7$, $\gamma_a$, $\gamma_b$, and $\gamma_c$ are the optimal cable paths obtained by APFMM, PFMM-I, PFMM-II, and SFMM, respectively.

TABLE V

| | | | Average distance between two adjacent grid points (km) | Number of grid points in T (million) | Total length of cable path (km) |
|---|---|---|---|---|---|
| Cable path | Running time (s) | RF | | | |
| $\gamma_7$ (APFMM) | 4575 | 0.000012 | 0.0671 | 24.4673 | 14516.94 |
| $\gamma_a$ (PFMM-I) | 24541 | 0.00059 | 0.0956 | 72.0324 | 14522.61 |
| $\gamma_b$ (PFMM-II) | 39946 | 0.00117 | 0.0941 | 72.0324 | 14603.89 |
| $\gamma_c$ (SFMM) | 184923 | NA | 1.5231 | 8.2578 | 14584.75 |

PERFORMANCE COMPARISON AMONG DIFFERENT FMMS.

In order to assess the number of rollbacks and parallel efficiency among APFMM, PFMM-I, and PFMM-II, a metric proposed in [20] is employed:

$$RF = \frac{\text{Total number of rollbacks}}{\text{Total number of grid points}}. \quad (12)$$

It can be seen in FIG. 10 that path $\gamma_7$ (dark dashed line) obtained by APFMM is close to path $\gamma_a$ (black solid line) of PFMM-I, while paths $\gamma_b$ (light dashed line) and $\gamma_c$ (gray solid line) obtained by PFMM-II and SFMM differ significantly from path $\gamma_7$ of APFMM. In more specific terms, the path $\gamma_7$, derived from the proposed APFMM, presents the highest accuracy with the shortest average distance between the adjacent grid points being a mere 0.0671 km. Moreover, it boasts the quickest execution time of 4575 seconds, which saves about 81% of the time compared to PFMM-I, as illustrated in Table V. Conversely, path $\gamma_c$ has the lowest accuracy with an average distance of 1.5231 km between adjacent grid points. It is noteworthy that although the proposed APFMM has higher-resolution data, SFMM struggles to load and process such data due to its completely serial nature. The precision of 1.5231 km average grid point distance is the highest achievable for SFMM, and the computation time has already reached 184923 seconds.

Additionally, Table V reveals that the number of rollbacks during APFMM's execution is considerably fewer compared to PFMM-I and PFMM-II. The RF value of APFMM is a meager 0.000012, vastly lower than PFMM-I's 0.00059 and PFMM-II's 0.00117. This can be attributed to the alignment of APFMM's sub-domain decomposition with $\overrightarrow{AB}$, which, as much as plausible, maintains consistency with the advancing direction of the path. This effective approach significantly reduces the number of rollbacks and unnecessary communication overhead between adjacent sub-domains. At the same time, the incorporation of MRA ensures that the quantity of grid points that APFMM needs to process during its execution is markedly lower than that of PFMM-I and PFMM-II. These combined factors contribute to a significantly reduced running time for APFMM, compared to PFMM-I and PFMM-II. PFMM-II, in contrast, has a longer running time and a higher RF value than PFMM-I. This is due to PFMM-II's domain decomposition lines being perpendicular to $\overrightarrow{AB}$, which causes the path to persistently cross sub-domains during its advancement, thereby leading to an increase in rollbacks and a reduction in parallel efficiency

CONCLUSION

The embodiments of the invention propose a novel adaptive parallel fast marching method named APFMM, which is rooted in an adaptive domain decomposition method and a multi-resolution method, providing a scalable and widely applicable approach skilled at planning high-precision, ultra-long-distance (over 14,000 km) submarine cable routes. The superiority of APFMM in submarine cable path planning is demonstrated by comparing it with two other parallel FMMs and the sequential FMM. Simulated experiment results substantiated that APFMM not only addresses the computational limitations of the sequential FMM, particularly with massive datasets but also trims the running time by over 81% compared to general parallel FMM. This makes efficient, automatic, and high-precision long-distance submarine cable path planning a tangible possibility. Moreover, the embodiments of the invention may foster enhancements in future cable path planning endeavors. Moreover, the embodiments of the invention transcends the sphere of submarine cable path planning. It has potential applications in domains dealing with large-scale data processing and intricate path planning, such as electricity cable layouts, gas pipeline construction, and transportation route planning.

The embodiments of the invention have the following advantages over the conventional method (i.e., MakaiPlan):

1) The proposed method embodiments utilize the FMM algorithm to find the optimal path in a given network, taking into account the 3D topography of the seafloor. In contrast, MakaiPlan uses the "great circle" method, which does not account for geodesic distance in the presence of terrain undulations, only provides the arc distance between two points on the surface of the sphere.

2) The proposed algorithm is highly automated and capable of determining the optimal path given specific parameters and data. The cable paths generated are already quite close to those obtained by experts through repeated manual adjustments, which can be regarded as references and benchmarks for cable path planners, significantly saving time and reducing the costs associated with ship exploration.

3) The proposed algorithm can consider unlimited factors affecting cable reliability and cost to automatically find the optimal path as long as the corresponding data is provided. In contrast, MakaiPlan can only automate the shortest-distance path planning. Multifactor consideration requires manual route adjustments in MakaiPlan based on expert experience.

System

Figure 11:
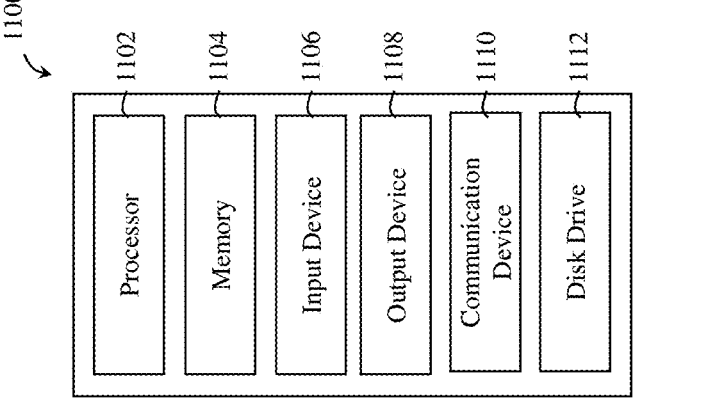
FIG. 11 shows an example information handling system in some embodiments of the invention.

FIG. 11 shows an example information handling system 1100 that can be used to perform one or more of the methods for submarine cable path planning in embodiments of the invention. The information handling system 1100 generally comprises suitable components necessary to receive, store, and execute appropriate computer instructions, commands, and/or codes. The main components of the information handling system 1100 are a processor 1102 and a memory (storage) 1104. The processor 1102 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1204 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1104. Computer instructions for executing or facilitating executing the method embodiments of the invention may be stored in the memory 1104. The processor 1102 and memory (storage) 1104 may be integrated or separated (and operably connected). Optionally, the information handling system 1100 further includes one or more input devices 1106. Example of such input device 1106 include: keyboard, mouse, stylus, image scanner, microphone, tactile/touch input device (e.g., touch sensitive screen), image/video input device (e.g., camera), etc. Optionally, the information handling system 1100 further includes one or more output devices 1108. Example of such output device 1108 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 1100 may further include one or more disk drives 1112 which may include one or more of: solid state drive, hard disk drive, optical drive, flash drive, magnetic tape drive, etc. A suitable operating system may be installed in the information handling system 1100, e.g., on the disk drive 1112 or in the memory 1104. The memory 1104 and the disk drive 1112 may be operated by the processor 1102. Optionally, the information handling system 1100 also includes a communication device 1110 for establishing one or more communication links (not shown) with one or more other computing devices, such as servers, personal computers, terminals, tablets, phones, watches, IoT devices, or other wireless computing devices. The communication device 1110 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1102, the memory 1104 (optionally the input device(s) 1206, the output device(s) 1108, the communication device(s) 1110 and the disk drive(s) 1112, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the information handling system 1100 shown in FIG. 11 is merely an example and that the information handling system 1100 can in other embodiments have different configurations (e.g., include additional components, has fewer components, etc.).

Although not required, one or more embodiments described with reference to the Figures can be implemented as an application programming interface (API) or as a series of libraries for use by a developer or can be included within another software application, such as a terminal or computer operating system or a portable computing device operating system. In one or more embodiments, as program modules include routines, programs, objects, components, and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings).

REFERENCES

[1] "Submarine telecoms industry report," Submarine Telecoms Forum, Inc., Sterling, Virginia, USA, Tech. Rep., October 2021 (accessed on 20 Jul. 2023). [Online]. Available: https://subtelforum.com/products/submarine-telecoms-industry-report/

[2] TeleGeography, "Submarine cable frequently asked questions," 2023 (accessed on 20 Jul. 2023). [Online]. Available: https://www2.telegeography.com/submarine-cable-faqs-frequently-asked-questions

[3] J. Kim, "Submarine cables: the invisible fiber link enabling the Internet," 4 May 2023 (accessed on 20 Jul. 2023). [Online]. Available: https://dgtlinfra.com/submarine-cables-fiber-link-internet/

[4] "Submarine cable system market size to hit USD 41.02 Bn by 2032," Precedence Research, Apt 1408 1785 Riverside Drive Ottawa, Canada, Tech. Rep., February 2023 (accessed on 20 Jul. 2023). [Online]. Available: https://www.precedenceresearch.com/submarine-cable-system-market

[5] T. Blaubach, "Connecting Beijing's Global Infrastructure: The PEACE Cable in the Middle East and North Africa," 7 Mar. 2022 (accessed on 20 Jul. 2023).

[Online]. Available: https://www.mei.edu/publications/connecting-beijings-global-infrastructure-peace-cable-middle-east-and-north-africa

[6] C. Mims, "Google, Amazon, Meta and Microsoft weave a fiber-optic web of power," January 2022 (accessed on 20 Jul. 2023). [Online]. Available: https://www.wsj.com/articles/google-amazon-meta-and-microsoft-weave-a-fiber-optic-web-of-power-11642222824

[7] X. Wang, Z. Wang, E. Tahchi, and M. Zukerman, "Submarine cable path planning based on weight selection of design considerations," *IEEE Access*, vol. 9, pp. 123 847-123 860, 2021.

[8] W. Qiu, "Submarine cables cut after Taiwan earthquake in December 2006," March 2011 (accessed on 20 Jul. 2023). [Online]. Available: https://www.submarinenetworks.com/en/news/cables-cut-after-taiwan-earthquake-2006

[9] C. Arthur, "Undersea internet cables off Egypt disrupted as navy arrests three," March 2013 (accessed on 20 Jul. 2023). [Online]. Available: https://www.theguardian.com/technology/2013/mar/28/egypt-undersea-cable-arrests

[10] X. Wang, Z. Wang, T. Wang, and M. Zukerman, "Designing cost-effective and reliable submarine communications cable path: Lessons from the Tonga volcano disaster," *IEEE Commun. Mag.*, 2023.

[11] J. A. Sethian, "Fast marching methods," *SIAM Review*, vol. 41, no. 2, pp. 199-235, 1999.

[12] Q. Wang, J. Guo, Z. Wang, E. Tahchi, X. Wang, B. Moran, and M. Zukerman, "Cost-effective path planning for submarine cable network extension," *IEEE Access*, vol. 7, pp. 61883-61895, 2019.

[13] V. Dolean, P. Jolivet, and F. Nataf, *An introduction to domain decomposition methods: algorithms, theory, and parallel implementation.* SIAM, 2015.

[14] B. F. Smith, "Domain decomposition methods for partial differential equations," in *Parallel Numerical Algorithms.* Springer, 1997, pp. 225-243.

[15] X. Cai, "Overlapping domain decomposition methods," in *Advanced Topics in Computational Partial Differential Equations: Numerical Methods and Diffpack Programming.* Springer, 2003, pp. 57-95.

[16] M. Herrmann, "A domain decomposition parallelization of the fast marching method," *Center for Turbulence Research Annual Research Briefs* 2003, 2003.

[17] A. Rosenfeld, *Multiresolution image processing and analysis.* Springer Science & Business Media, 2013, vol. 12.

[18] H. Wu, Z. Zhao, and Z. Wang, "META-Unet: Multiscale efficient transformer attention Unet for fast and high-accuracy polyp segmentation," *IEEE Trans. Autom. Sci. Eng.*, 2023.

[19] M. Zukerman, Z. Wang, Q. Wang, W. Moran, X. Wang, E. Tahchi, and F. C. Leung, "Infrastructure link path arrangement determination method and system," Jan. 18, 2022, U.S. Pat. No. 11,228,523.

[20] M. Breuß, E. Cristiani, P. Gwosdek, and O. Vogel, "An adaptive domain-decomposition technique for parallelization of the fast marching method," *Appl. Math. Comput.*, vol. 218, no. 1, pp. 32-44, 2011.

[21] G. Evans and M. Page, "The planning and surveying of submarine cable routes," in *Submarine Cables.* Brill Nijhoff, 2014, pp. 91-122.

[22] Makai Ocean Engineering, "Submarine cable services," 2015 (accessed on 20 Jul. 2023). [Online]. Available: https://www.makai.com/

[23] S. Neumayer, G. Zussman, R. Cohen, and E. Modiano, "Assessing the vulnerability of the fiber infrastructure to disasters," *IEEE/ACM Trans. Netw.*, vol. 19, no. 6, pp. 1610-1623, 2011.

[24] P. N. Tran and H. Saito, "Geographical route design of physical networks using earthquake risk information," *IEEE Commun. Mag.*, vol. 54, no. 7, pp. 131-137, 2016.

[25] M. Zhao, T. W. Chow, P. Tang, Z. Wang, J. Guo, and M. Zukerman, "Route selection for cabling considering cost minimization and earthquake survivability via a semi-supervised probabilistic model," *IEEE Trans. Ind. Inform.*, vol. 13, no. 2, pp. 502-511, 2016.

[26] Z. Wang, Q. Wang, M. Zukerman, J. Guo, Y. Wang, G. Wang, J. Yang, and B. Moran, "Multiobjective path optimization for critical infrastructure links with consideration to seismic resilience," *Comput.-Aided Civ. Infrastruct. Eng.*, vol. 32, no. 10, pp. 836-855, 2017.

[27] C. Huang, Z. Ming, and H. Huang, "Drone stations-aided beyond-battery-lifetime flight planning for parcel delivery," *IEEE Trans. Autom. Sci. Eng.*, 2022.

[28] Q. Wang, Z. Wang, J. Guo, E. Tahchi, X. Wang, B. Moran, and M. Zukerman, "Path planning of submarine cables," in *Proc. 21st International Conference on Transparent Optical Networks (ICTON).* IEEE, 2019, pp. 1-4.

[29] Z. Wang, Q. Wang, B. Moran, and M. Zukerman, "Optimal submarine cable path planning and trunk-and-branch tree network topology design," *IEEE/ACM Trans. Netw.*, vol. 28, no. 4, pp. 1562-1572, 2020.

[30] T. Wang, Z. Wang, B. Moran, X. Wang, C. Guo, and M. Zukerman, "Latency-aware optimization of submarine communication cable systems with trunk-and-branch topologies," *J. Light. Technol.*, vol. 40, no. 17, pp. 5825-5841, 2022.

[31] T. Wang, Z. Wang, B. Moran, and M. Zukerman, "Submarine cable network design for regional connectivity," *IEEE/ACM Trans. Netw.*, vol. 30, no. 6, pp. 2480-2492, 2022.

[32] T. G. B. C. of the Oceans, "Gridded bathymetry data," 2023 (accessed on 20 Jul. 2023). [Online]. Available: https://www.gebco.net/data_and_products/gridded_bathymetry_data/

[33] S. Blaise and B. Spinewine, "Efficient curvature-constrained least cost route optimization on parallel architectures," *Eng. Comput.*, pp. 1-17, 2021.

[34] M. Akian, S. Gaubert, and S. Liu, "A multilevel fast-marching method," in *Proc. MTNS 25th International Symposium on Mathematical Theory of Networks and Systems*, 2022.

[35] S. Vadrevu and R. Nagi, "A GPU accelerated dual-ascent algorithm for the multidimensional assignment problem in a multitarget tracking application," *IEEE Trans. Autom. Sci. Eng.*, 2022.

[36] J. Xin, G. Xie, B. Yan, M. Shan, P. Li, and K. Gao, "Multimobile robot cooperative localization using ultra-wideband sensor and GPU acceleration," *IEEE Trans. Autom. Sci. Eng.*, vol. 19, no. 4, pp. 2699-2710, 2021.

[37] Y. Huang, "Improved fast iterative algorithm for Eikonal equation for GPU computing," *arXiv preprint arXiv:2106.15869*, 2021.

[38] J. Monsegny, J. Monsalve, K. Leo´n, M. Duarte, S. Becerra, W. Agudelo, and H. Arguello, "Fast marching method in seismic ray tracing on parallel GPU devices," in *Proc. Latin American High Performance Computing Conference.* Springer, 2018, pp. 101-111.

[39] Z. Zhao, J. Wang, G. Gao, H. Wang, and D. Wang, "Multi-objective optimization for submarine cable route planning based on the ant colony optimization algorithm," vol. 10, no. 8, 2023, article number: 896.

[40] D. Li, L. Wang, J. Cai, K. Ma, and T. Tan, "Research on terminal distance index-based multi-step ant colony optimization for mobile robot path planning," *IEEE Trans. Autom.* Sci. Eng., 2022.

[41] G. Diamantopoulos, J. Weinbub, A. Ho¨ssinger, and S. Selberherr, "Evaluation of the shared-memory parallel fast marching method for re-distancing problems," in *Proc. 17th International Conference on Computational Science and Its Applications (ICCSA)*. IEEE, 2017, pp. 1-8.

[42] X. Wang, G. Cheng, Z. Wang, and M. Zukerman, "A research on submarine cable path planning," in *Proc. Eighth Symposium on Novel Photoelectronic Detection Technology and Applications*, vol. 12169. SPIE, 2022, pp. 512-519.

[43] G. Diamantopoulos, A. Ho¨ssinger, S. Selberherr, and J. Weinbub, "A shared memory parallel multi-mesh fast marching method for re-distancing," *Adv. Comput. Math.*, vol. 45, pp. 2029-2045, 2019.

[44] J. Weinbub and A. Ho¨ssinger, "Shared-memory parallelization of the fast marching method using an overlapping domain-decomposition approach," in *Proc. 24th High Performance Computing Symposium*, 2016, pp. 1-8.

[45] M. Quell, G. Diamantopoulos, A. Ho¨ssinger, and J. Weinbub, "Shared-memory block-based fast marching method for hierarchical meshes," *J. Comput. Appl. Math.*, vol. 392, p. 113488, 2021.

[46] ITU, "Maximising availability of international connectivity in developing countries: Strategies to ensure global digital inclusion," December 2016 (accessed on 20 Jul. 2023). [Online]. Available: http://handle.itu.int/11.1002/pub/80f5eade-en

[47] K. Eriksson, D. Estep, and C. Johnson, *Applied mathematics: Body and soul: Volume 1: Der1ivatives and geometry in IR3*. Springer Science & Business Media, 2013.

[48] D. Burago, Y. Burago, and S. Ivanov, *A course in metric geometry*. American Mathematical Society, 2022, vol. 33.

[49] J. A. Sethian et al., *Level set methods and fast marching methods*. Cambridge Cambridge UP, 1999, vol. 98, no. 2.

[50] R. Kimmel and J. A. Sethian, "Optimal algorithm for shape from shading and path planning," *J. Math. Imaging Vis.*, vol. 14, pp. 237-244, 2001.

[51] "Computing geodesic paths on manifolds," *Proceedings of the National Academy of Sciences*, vol. 95, no. 15, pp. 8431-8435, 1998.

[52] K.-H. Hoffmann and J. Zou, "Parallel efficiency of domain decomposition methods," *Parallel Comput.*, vol. 19, no. 12, pp. 1375-1391, 1993.

[53] E. Cristiani and M. Falcone, "A characteristics driven fast marching method for the Eikonal equation," in *Proc. 7th European Conference on Numerical Mathematics and Advanced Applications, Graz, Austria, September* 2007. Springer, 2008, pp. 695-702.

The invention claimed is:

1. A computer-implemented method for ultra-long distance path planning, comprising:
(a) decomposing a target area into two initial sub-domains, the target area covering a path from a starting point to an end point, at an initial resolution along a direction connecting the starting point to the end point;
(b) executing a Fast Marching Method (FMM) in parallel in the two initial sub-domains to obtain an initial path connecting the starting point to the end point;
(c) decomposing an area enclosing the initial path into a plurality of subsequent sub-domains at a resolution higher than the initial resolution, wherein the area enclosing the initial path is decomposed aligned with the direction connecting the starting point to the end point;
(d) executing the FMM in parallel in all the sub-domains to obtain an optimal path connecting the starting point and the end point.

2. The computer-implemented method of claim 1, further comprising:
(e) iterating the steps (c) and (d) by increasing the number of the subsequent sub-domains until the optimal path is obtained.

3. The computer-implemented method of claim 2, wherein in the step (e) the resolution is increased as the number of the subsequent sub-domains is increased.

4. The computer-implemented method of claim 3, wherein the resolution is not increased in the target area outside the area enclosing the initial path given that the path obtained from a previous loop did not traverse the area.

5. The computer-implemented method of claim 1, wherein the optimal path is determined based on a minimal total life-cycle cost for an object installed along the path.

6. The computer-implemented method of claim 5, wherein the object comprises a submarine cable.

7. The computer-implemented method of claim 6, wherein a total life-cycle cost for a cable path is determined by integrating a life-cycle cost per unit length of the submarine cable across the total cable length, the life-cycle cost being based on the sum of weighted cost elements corresponding to initial outlay for construction, recurring costs for maintenance, and/or expenses related to repairs for the submarine cable.

8. The computer-implemented method of claim 1, wherein executing the FMM comprises employing a nonlinear partial differential equation, or preferably employing the Eikonal equation.

9. The computer-implemented method of claim 1, wherein in step (c) the area enclosing the initial path is defined by two decomposition lines parallel to the direction connecting the starting point to the endpoint and enclosing the initial path.

10. The computer-implemented method of claim 9, wherein the area enclosing the initial path is decomposed such that a frequency of communication between adjacent sub-domains is reduced.

11. The computer-implemented method of claim 1, wherein in step (c) the sub-domains are divided along the fastest propagation direction of the FMM.

12. The computer-implemented method of claim 1, wherein the target area or the area enclosing the initial path is decomposed to have overlapping regions between adjacent sub-domains.

13. The computer-implemented method of claim 1, wherein the ultra-long distance is 10,000 km or more, or preferably 14,000 km or more.

14. A computer-implemented method for submarine cable path planning, comprising:
(a) initializing decomposition index k=1 and assigning an initial resolution to a target area T covering a path from a starting point to an end point;

(b) decomposing the target area T into two initial sub-domains along a direction connecting the starting point to the end point;

(c) executing a Fast Marching Method (FMM) in parallel from the starting point for each sub-domain to obtain an initial cable path;

(d) increasing the decomposition index k=k+1, and identifying two decomposition lines $$l_1^k$$

and $$l_2^k$$

parallel to the direction connecting the starting point to the endpoint and enclosing the initial cable path, wherein the target area is divided into an area $$T_{l_1^k l_2^k}$$

between the two decomposition lines $$l_1^k$$

and $$l_2^k,$$

and two sub-domains $$T_{l_1^k}$$

and $$T_{l_2^k}$$

outside the decomposition lines $$l_1^k$$

and $$l_2^k;$$

(e) increasing the resolution for the area $$T_{l_1^k l_2^k}$$

between the two decomposition lines $$l_1^k$$

and $$l_2^k,$$

and decomposing the area $$T_{l_1^k l_2^k}$$

into $2^{k-1}$ sub-domains $$\left( T_{l_1^k l_3^k}, T_{l_3^k l_4^k}, \dots, T_{l_{3+2^{k-1}-1}^k l_2^k} \right),$$

aligned with the direction connecting the starting point to the end point;

(f) assigning the $2^{k-1}$ sub-domains in the area $$T_{l_1^k l_2^k}$$

along with the two sub-domains $$T_{l_1^k}$$

and $$T_{l_2^k}$$

outside the decomposition lines $$l_1^k$$

and $$l_2^k$$

to $2^k$ to $2^{k-1}+2$ threads to execute the FMM in parallel for all the sub-domains to obtain an optimal cable path;

(g) reiterating the steps (d) to (f) until the area $$T_{l_1^k l_2^k}$$

achieves the highest possible data resolution, or the total number of sub-domains for the next decomposition $2^k+2$ surpasses a predetermined maximum number of available threads.

15. The computer-implemented method of claim 14, wherein in step (e), the area $$T_{l_1^k l_2^k}$$

is divided into equally-sized $2^{k-1}$ sub-domains along the direction connecting the starting point to the end point.

16. The computer-implemented method of claim 14, wherein for the target area T outside the area $$T_{l_1^k l_2^k},$$

the resolution is not increased given that the cable path obtained from a previous loop did not traverse the area.

17. The computer-implemented method of claim 14, wherein the optimal cable path is determined based on a minimal total life-cycle cost for the submarine cable.

18. The computer-implemented method of claim 14, wherein the FMM is designed to consider a 3D topography of a seafloor.

19. A system for submarine cable path planning, comprising:

one or more processors; and a memory storing one or more programs configured to be executed by the one or more processors, the one or more programs including instructions for performing or facilitating performing of the computer-implemented method of claim 1.

20. A system for submarine cable path planning, comprising:

one or more processors; and a memory storing one or more programs configured to be executed by the one or more processors, the one or more programs including instructions for performing or facilitating performing of the computer-implemented method of claim 14.

21. A non-transitory computer readable medium having instructions stored thereon which, when executed by one or more processors, cause the one or more processors to execute the computer-implemented method of claim 1.

22. A non-transitory computer readable medium having instructions stored thereon which, when executed by one or more processors, cause the one or more processors to execute the computer-implemented method of claim 14.

* * * * *